(12) United States Patent
Downs et al.

(10) Patent No.: US 12,368,687 B2
(45) Date of Patent: Jul. 22, 2025

(54) CONVERSATION-ENABLED DOCUMENT SYSTEM AND METHOD

(71) Applicant: Open Text Corporation, Waterloo (CA)

(72) Inventors: James Matthew Downs, Lexington, KY (US); Byron Steven Pruitt, Lexington, KY (US); Jeffrey Alan Cole, Georgetown, KY (US); Anthony Wiley, Rancho Santa Fe, CA (US)

(73) Assignee: Open Text Corporation, Menlo Park, CA (US)

( * ) Notice: Subject to any disclaimer, the term of this patent is extended or adjusted under 35 U.S.C. 154(b) by 0 days.

(21) Appl. No.: 18/521,876

(22) Filed: Nov. 28, 2023

(65) Prior Publication Data
US 2024/0106768 A1   Mar. 28, 2024

Related U.S. Application Data

(63) Continuation of application No. 17/403,643, filed on Aug. 16, 2021, now Pat. No. 11,870,738, which is a continuation of application No. 16/459,360, filed on Jul. 1, 2019, now Pat. No. 11,095,577.

(51) Int. Cl.
*H04L 51/02* (2022.01)
*G06F 16/93* (2019.01)
*G06F 40/186* (2020.01)

(52) U.S. Cl.
CPC .............. *H04L 51/02* (2013.01); *G06F 16/93* (2019.01); *G06F 40/186* (2020.01)

(58) Field of Classification Search
CPC ......... H04L 51/02; G06F 16/93; G06F 40/186

USPC ........................................................ 709/206
See application file for complete search history.

(56) References Cited

U.S. PATENT DOCUMENTS

| | | | |
|---|---|---|---|
| 12,058,086 B2 | 8/2024 | Downs et al. | |
| 2017/0192948 A1* | 7/2017 | Gaither | G06F 40/174 |
| 2017/0270083 A1* | 9/2017 | Pruitt | G06F 40/14 |
| 2017/0300465 A1* | 10/2017 | Kloiber | G06F 16/958 |

(Continued)

OTHER PUBLICATIONS

Office Action issued for U.S. Appl. No. 18/168,457, mailed Nov. 28, 2023, 18 pages.

(Continued)

*Primary Examiner* — Nicholas R Taylor
*Assistant Examiner* — Chong G Kim
(74) *Attorney, Agent, or Firm* — Sprinkle IP Law Group

(57) ABSTRACT

One embodiment comprises a non-transitory, computer-readable medium embodying thereon computer-executable instructions for receiving a document design, generating a conversation-enabled document from the document design, exposing the conversation-enabled document on a conversation channel, receiving a participant response, updating the conversation-enabled document based the participant response, and rendering a communication page on a second channel using the updated conversation-enabled document. The document design comprises a page template and a conversation template. The page template specifies content of the communication page and a variable to be populated with a first variable value. The conversation template defines a state machine for an automated conversation, the conversation template specifying a variable to which the participant response is to be written.

22 Claims, 12 Drawing Sheets

(56) References Cited

U.S. PATENT DOCUMENTS

2018/0239810 A1 8/2018 Pruitt et al.
2024/0414111 A1 12/2024 Downs et al.

OTHER PUBLICATIONS

Notice of Allowance issued for U.S. Appl. No. 18/168,457, mailed Mar. 22, 2024, 8 pages.

* cited by examiner

FIG. 2

CONVERSATION-ENABLED DOCUMENT SYSTEM AND METHOD

RELATED APPLICATION(S)

This application is a continuation of, and claims a benefit of priority under 35 U.S.C. 120 of, U.S. patent application Ser. No. 17/403,643 filed Aug. 16, 2021, entitled "Conversation-Enabled Document System and Method," issued as U.S. Pat. No. 11,870,738, which is a continuation of, and claims a benefit of priority under 35 U.S.C. 120 of, U.S. patent application Ser. No. 16/459,360 filed Jul. 1, 2019, entitled "Conversation-Enabled Document System and Method," issued as U.S. Pat. No. 11,095,577, which are hereby incorporated herein for all purposes.

TECHNICAL FIELD

This disclosure relates generally to the management, development, editing, deployment, and communication of content. More particularly, this disclosure relates to embodiments of systems and methods for a conversation-enabled document for delivery on a communication channel. Even more specifically, this disclosure relates to embodiments of systems and methods for conversation-enabled documents for multi-channel delivery.

BACKGROUND

Ever since the advent of the computer networks (including the Internet), enterprise environments have been steadily growing more complicated, encompassing an ever-expanding amount of increasingly complex digital assets (or just assets). A digital asset, in essence, is anything that exists in a binary format that may exist in the enterprise environment or otherwise be utilized by the enterprise. The digital assets of an enterprise may thus include a variety of digital content (content) including text, images, aural or video content, templates used in content delivery or other types of content. For purposes of this disclosure, the term content will be used interchangeably with the term asset and understood to have the same definition as an asset.

In an enterprise environment, these assets may be widely distributed and used for a wide variety of purposes in association with that enterprise. To aid in managing and using their various assets, many enterprises have employed a number of content management systems, such as digital asset management (DAM) systems, content management systems (CMS), web content management (WCM) systems, enterprise content management (ECM) systems, etc. The distribution of content across an enterprise in these various management systems, along with widespread and distributed use of such content, therefore, results in an extremely complex web of interconnectivity involving hundreds or sometimes thousands of systems or people.

Oftentimes enterprises (e.g., almost any profit or non-profit entity such as a service company, an insurance or utility company or another type of entity) wish to communicate with their customers or other entities with whom they wish to engage (e.g., distributors, partners, regulatory bodies, donators, etc.) via multiple communications channels. While the types of content management systems discussed above are useful in creating, versioning and controlling access to content, they do not provide a convenient mechanism to integrate such content in outbound communications across multiple channels.

To address the need for multi-channel communication, an enterprise may integrate a customer communication management (CCM) system. CCM systems can provide an enterprise with an application to improve outbound communications with their distributors, partners, regulatory bodies, customers or others. Such CCM systems may allow an enterprise to improve the creation, delivery, storage or retrieval of outbound communications, including communications used for marketing, new product introductions, renewal notifications, claims correspondence, documentation, bill statements, advertising, payment notifications, etc. These communications can occur through a number of output channels including email, Short Message Service (SMS), web pages, and mobile applications.

Human interaction, however, is an important step in many enterprise customer communication processes. While CCM systems may provide improved control of outbound communications, they do not provide a straightforward ability to incorporate customer interactions, such as interactions through conversation platforms, into documents.

SUMMARY

Accordingly, embodiments as disclosed may provide a way to design, deploy and utilize conversation-enabled documents. The conversation-enabled documents may be agnostic to the conversation channels on which they can be exposed. For example, a conversation platform independent conversation-enabled document can be translated by a variety of connectors to heterogeneous conversation channels. Thus, the conversation-enabled document, according to some embodiments, can be exposed to heterogeneous conversation platforms, such as various chatbot, voice assistant platforms, social media platforms or other platforms that support automated conversations with end users. Through a conversation controlled by the conversation-enabled document, the conversation-enabled document may be modified by a conversation participant's responses and various data may be queried to provide desired information to the conversation participant.

Further, the conversation-enabled document may be rendered to other channels, including non-conversation channels. For example, a conversation-enabled document modified via a conversation may be rendered to a print channel, email channel, SMS channel, or electronic output channel. A conversation-enabled document may be used to create customer communications where the content, layout or other aspects of the customer communication depends on conversation participant's responses.

One embodiment comprises a non-transitory computer readable medium comprising computer-executable instructions executable to access a conversation-enabled document and expose the conversation-enabled document on a first conversation channel as a conversation into the conversation-enabled document. The conversation-enabled document can comprise a conversation component for controlling a conversation interface into the conversation-enabled document, the conversation component specifying conversation steps, routing between conversation steps and a document variable to accept a conversation participant response. The computer-executable instructions can be executable to set a document variable value in the conversation-enabled document based on the participant response received via the conversation interface and render the conversation-enabled document to a second channel using the document variable and the page template.

According to one embodiment, the computer-executable instructions are executable to determine content of the conversation-enabled document to render to the second channel based on the document variable value and render the conversation-enabled document to the second channel using the determined content.

According to one embodiment, the conversation-enabled document is a conversation-enabled interactive document. The conversation-enabled interactive document may include a web-intrinsic portion.

According to one embodiment, the conversation component comprises a set of node templates representing the conversation steps. In such an embodiment, the non-transitory computer readable medium may be executable to parse the conversation component and create a conversation graph comprising nodes created from the node templates. A plurality of connectors can be provided for translating the nodes of the conversation graph to heterogenous conversation channels.

The computer-executable instructions can be executable to initiate a finite state machine for tracking a current state of the conversation where the finite state machine comprises a set of states, each state in the set of states corresponding to a node in the conversation graph.

According to one embodiment, the computer-executable instructions are executable to receive a request for a step in the conversation from the conversation channel and translate a node corresponding to a current state to a format consumable by the conversation channel for presenting the conversation interface.

Another embodiment includes a method comprising accessing a conversation-enabled document and exposing the conversation-enabled document on a first conversation channel as a conversation into the conversation-enabled document, the conversation-enabled document comprising a conversation component for controlling a conversation interface into the conversation-enabled document and a page template, the conversation component specifying conversation steps, routing between conversation steps and a document variable to accept a conversation participant response. The method can further include receiving a conversation participant response via the conversation interface, setting a document variable value in the conversation-enabled document based on the participant response received via the conversation interface and rendering the conversation-enabled document to a second channel using the document variable and page template. According to one embodiment, the conversation-enabled document is a conversation-enabled interactive document.

According to one embodiment, the method includes determining content of the conversation-enabled document to render to the second channel based on the document variable value and rendering the conversation-enabled document to the second channel using the determined content.

According to one embodiment, the conversation component comprises a set of node templates representing the conversation steps. The method may further include parsing the conversation component and creating a conversation graph comprising nodes created from the node templates. The method may further include providing a plurality of connectors adapted to translate the nodes of the conversation graph to heterogenous conversation channels.

One embodiment further includes initiating a finite state machine for tracking a current state of the conversation, the finite state machine comprising a set of states, each state in the set of states corresponding to a node in the conversation graph. The method may further include receiving a request for a step in the conversation from the conversation channel and translating a node corresponding to a current state to a format consumable by the conversation channel for presenting the conversation interface.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 2 is a diagrammatic representation of designing a document page template.

DETAILED DESCRIPTION

Figure 1:
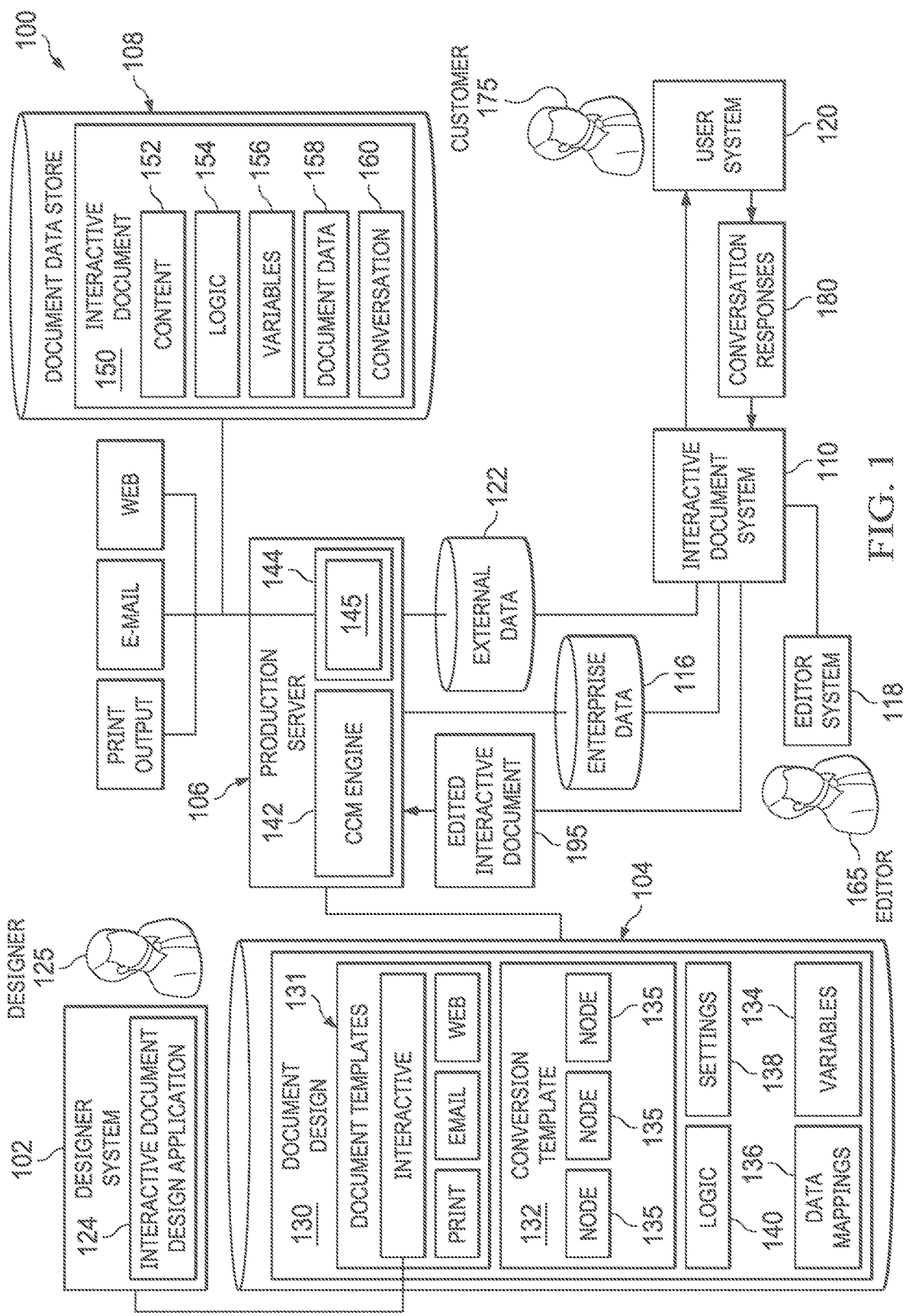
FIG. 1 is a diagrammatic representation of one embodiment of a computer implemented system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As discussed above, to address the need for multi-channel communication, an enterprise may integrate a customer communication management (CCM) system. A CCM system may allow a user to define templates for rendering customer communications on one or more channels (e.g., email, SMS, web page, print, PDF). Templates may specify static content as well as the content that can change based on customer data or other data and how content behaves (e.g., reflows or otherwise behaves). Such templates may include variables and have associated logic. A CCM system may process a template to render customer communications from the template.

As will be appreciated, part of processing a template may include fetching or determining variable values, where the variable values may appear in customer communications, be used to select content that appears in customer communications, or otherwise affect rendering of customer communications. By way of example, but not limitation, a financial institution may use an account statement template that includes an account type variable, a customer name variable, and financial statement variables representing transaction data to pull for the customer account, where the account type variable is used to select a text block to appear in a customer email, the customer name variable is used to populate the customer's name in the email and the financial statement variables are used to populate the email with a transaction history for the customer's account.

In some implementations, a CCM may be capable of creating an interactive document. As will be appreciated, interactive documents are applications that give a user the visual editing experience of editing a document as it also looks or similar to how it looks in its printed form. Sections of the document can be read-only while others are editable, enabling the user to dynamically conform artifacts, such as images, to specific users. Interactive documents are often used in enterprises to enable agents of the enterprise, such as customer service representatives of a business, insurance agents or agents of a government agency, for example, to quickly and easily create standardized and visually appealing documents that can be used for customer interactions.

As an example, an insurance institution may use an interactive document for creating correspondence related to claims and an agent may interact with the interactive document, while meeting with a customer. During this interaction, the necessary information relating to a claim can be entered into the interactive document. Upon entering the necessary information, the interactive document can adjust as necessary in response to the entered data to create the final output of the document.

After editing by an agent, an edited interactive document may be fulfilled by a variety of fulfillment mechanisms. For example, the edited document can be processed by the CCM system to generate an email, a print document or a customer-facing web page.

Systems and methods for designing and deploying conversation-enabled documents, including conversation-enabled interactive documents, are provided herein. In various embodiments, a conversation-enabled document can be created that includes an integrated conversation component that controls a conversation interface into a document. The conversation interface may be used to populate document variable values and thus affect what content appears when the document is rendered to end-users via other channels, such as customer communications for example.

According to one embodiment, a conversation-enabled document may be an instance of a document application containing all the data and designs necessary for the document. The document may incorporate a conversation component and can be exposed across supported conversation channels.

The conversation-enabled document may be agnostic to the conversation channels on which they can be exposed. For example, a conversation platform independent conversation-enabled document can be translated by a variety of connectors to heterogeneous conversation channels. Thus, the conversation-enabled document, according to some embodiments, can be exposed to heterogeneous conversation platforms, such as various chatbot, voice assistant platforms, social media platforms or other platforms that support automated conversations with end users. Through a conversation controlled by the conversation-enabled document, the conversation-enabled document may be modified by a conversation participant's responses and various data may be queried to provide desired information to the conversation participant.

Referring then to FIG. 1, one embodiment of a computer implemented system 100 is depicted. System 100 includes an enterprise CCM environment that comprises a designer system 102, a design data store 104, a production server 106, a document store 108, an interactive document system 110, an enterprise data source 116 and an editor system 118. System 100 further includes a user system 120 and an external data source 122. Enterprise data source 116 may comprise a plurality of data sources including, but not limited to, digital asset management (DAM) systems, content management systems (CMS), web content management (WCM) systems, enterprise content management (ECM) systems, or other data source. Similarly, external data source 122 may comprise a plurality of external data sources. System 100 may be a distributed, networked computing environment comprising a plurality of computing systems or applications coupled through a network. The network may be the Internet, an intranet, a wireless or wired network, a local access network (LAN), a wide access network (WAN), a cellular network or some combination of these types of networks, or another type or types of networks.

The enterprise CCM environment implements a design environment that allows designers to create document designs that can be manifested across multiple channels. To this end, the enterprise CCM environment includes a designer system 102 that runs a design application 124 to provide the design environment in which designers (e.g., designer 125) can create document designs. The design application 124 may be, for example, a resident application at the computing system 102, such as a desktop application, or may be a web-based application. According to one embodiment, design application 124 provides an object-oriented design environment in which components of a design are represented by objects. Document designs created by design application 124, such as document design 130, may be stored to a design data store 104.

In a design phase, a designer 125 (e.g., users at an enterprise) may create various document templates, such as document template 131. A document template can include a number of assets (e.g., other content items, including other templates), where each of these content items may be from one or more other distributed network locations such as a DAM system, WCM system or ECM system within that enterprise. A CCM system may use the template to generate a communication for a user associated with the enterprise (e.g., a customer, an agent) and deliver that communication in a format and through a communication channel associated with that user (e.g., as determined from a user or customer database). It is common for enterprises to have hundreds of thousands of document templates for use in their CCMs, where these templates can generate millions of communications per month or more.

The design application 124 may thus present the user with a graphical interface at the user's computing device (e.g., designer system 102) to allow the user to design and select content items in content management systems for inclusion in a created document template and to specify which areas of the document template may accept content or where content may otherwise be changed, added, removed or edited. The design application 124 may also allow the designed document template to be saved in a content management system of the enterprise such that the template may be managed as content of the enterprise.

The design phase, according to one embodiment, is not merely an edit phase, but is an application type development environment where document designs are created as document applications. Design 130 may include all of the design objects and their property settings that make up a statement, letter, invoice, bill or other customer communication. In some embodiments, design 130 sets a framework of how objects and portions of documents generated from design 130 are presented as well as the rules governing that presentation, thus setting the overall appearance of communications to end-users. Design 130 may also define the data sources available and the rules governing their selection, as well as the access and authentication regarding user ability to change certain content elements and access to any or all available data sources.

Design 130 provides an abstract description for how end-user communications should appear. Design 130 describes the overall layout of the communications and determines which parts of an end-user communication will contain static information, such as standardized text, and which parts of the end-user communication will be filled according to rules. Design 130 can specify editable and viewable text, optional and selectable paragraphs, variables, values for variables or text areas, sources for content (e.g., values of variables, text for text areas, images), rules for populating content, resource rights, and user rights, among others.

Design 130 can comprise document templates for multiple forms of customer communication across various channels (e.g., templates for print, web, email, interactive document or other channels). A single document design 130 may include any number of document templates. For example, an enterprise may have hundreds of correspondence letter templates and a single document design 130 can contain all of these templates.

A document template (e.g., document template 131) may be used to generate customer communications having one or more pages. To this end, a document template may include one or more page templates for email, print, customer-facing web pages, interactive document pages or other output, where the page templates specify the content, layout and formatting an end-user sees in a customer communication. A page template can specify editable and viewable text for a page, optional and selectable paragraphs for the page, variables, values for variables or text areas of the page, sources for content of the page, rules for populating content of the page, resource rights for the page, and user rights for the page, among others. A page template can thus specify the overall layout of an individual page, which parts of the page will contain static information, which parts will be filled according to rules, and how content on a page behaves (e.g., reflows or otherwise behaves). A page template for an interactive document may further specify which portions of the page are editable by an editor-user.

Page templates can reference associated styles, logic, variables or other objects. For example, a page template may reference a style sheet. While a single design 130 may contain many page templates and styles, a design 130 may also contain relatively few templates and styles (e.g., a single page template) with zero or more styles. The content and layout specified by design 130 may be in accordance with specifications provided by the enterprise.

In accordance with the present disclosure, designer 125 can design a conversation-enabled document that includes a conversation component for controlling a conversation interface into the document. To this end, the designer 125 can add a conversation design to document design 130. In one embodiment, designer 125 at designer system 102 utilizes design application 124 to design the conversation. Designer 125 can use the same suite of tools as he or she would use to design other templates and can reuse content, variables and variable data used by other templates or designs.

Designing a conversation may include designing a conversation template, where the conversation template includes a set of node templates representing the steps of a conversation. The design application 124 may thus present the user with a graphical interface at the user's computing device 102 to allow the user to design and select content items in content management systems for inclusion in the created conversation templates and node templates and to specify which steps of a conversation may accept content and at which steps content may be added, changed, etc. The design application 124 may also allow the designed conversation templates and node templates to be saved in a content management system of the enterprise such that the templates may be managed as content of the enterprise.

Designer 125 may thus create node templates that correspond to conversation steps and create a conversation template that includes node templates. A conversation template can map out a finite state machine for a conversation that, potentially, comprises many states. Given any state there can be certain triggers to move to the next state. The conversation at any point can query for different data from the conversation-enabled document or other data sources and provide possible answers.

Document design 130 may thus include conversation template 132 and node templates 135. Conversation template 132, according to one embodiment, is an abstract design of an automated conversation and defines the finite state machine, including the overall content and logic, of an automated conversation.

Conversation template 132, according to one embodiment, specifies content to output for conversation states, data to collect for conversation states and triggers between states. By way of example, conversation template 132 specifies prompts, variables, data types, messages to provide when particular events occur, rules on responses, validation, routing or other aspects of a conversation.

More particularly, according to one embodiment, conversation template 132 comprises a plurality of node templates 135, where each node template corresponds to a step in a conversation. For each node template, designer 125 can configure various aspects of a conversation step. A node template can specify, for example, a prompt for a conversation step, variables that receive data at the conversation step, data that is expected to be received from a conversation participant at the conversation step, variables that provide data to the conversation step, a "do not understand" message for the conversation step, rules on responses, validation rules, routing logic or other information.

In general, a prompt defines the text, audio or other output that a conversation platform (e.g., chatbot, voice assistant, IVR system) should output for a step in a conversation. Prompts may be simple text or can incorporate variables and logic so that the prompt may vary based on context. In some cases, a node may include multiple prompts, including, but not limited to an entrance prompt or an exit prompt for the node.

As discussed above, a prompt may include variables or logic. For example, a prompt may include various prompt options and logic to select a prompt option based on the value of a variable. For a system that supports audio-based conversations, a prompt may include an audio file in addition to or as an alternative to text.

A node template may also specify variables to which response data received from a conversation participant at a step is to be written and the data type expected to be received for the variable (number, enum, string, etc.). In some embodiments, the designer may specify a finite list of participant response options, such as an indexed list, and the variable to which a user selection of a response option is to be written. For a system that supports audio conversations, response options may be provided as audio files in addition to or as an alternative to text.

A node template can specify a "do not understand" message for a conversation step. The "do not understand" message is a message to be provided if the conversation participant response data received during a step is not the proper data type for the variable specified to receive that date, the conversation participant response data cannot be validated or the conversation participant response data is otherwise not considered understandable based on a rule. For a system that supports audio conversations, a "do not understand message" may be provided as an audio file in addition to or as an alternative to text.

A node template may specify rules on responses. Rules on responses may include rules to execute based on a conversation participant's response, such as the conversation participant's selection of a response option at a conversation step. A rule on a response may include code to execute. For example, if a node includes the participant response option "Why did my bill go up," the node may include an associated rule on response that comprises code to make a web service call to an enterprise application for data related to the participant's bill and code to determine a reason why the conversation participant's bill went up.

A node template may specify validation rules that include expressions or code to validate conversation participant response data.

A node template may specify routing logic that comprises rules regarding which node to route to next. A routing rule may include, for example, an expression or code.

In some embodiments, a conversation template 132 is embodied as a conversation object that references a plurality of node objects. For example, the conversation template and node templates may be persisted as JavaScript Object Notation (JSON) objects.

A conversation-enabled document design 130 may include supporting data used to support creating a document from design 130. Design 130 may include, for example, a list of variables 134 referenced in design 130, data mappings 136 mapping data sources to variables (e.g., mapping data from enterprise data source 116, external data source 122 or other data to variables), settings 138 for which types of outputs can be generated, and logic 140 (e.g., how to process incoming data and other logic). In some embodiments, a data mapping 136 may map a variable to a data source, where the data source is a file containing records or other data pulled from enterprise data source 116 or external data source 122.

Once design 130 has been finalized it can then be used in production. To this end, production server 106 provides a CCM engine 142 that processes the document's abstract design description (design 130) and produces a conversation-enabled document 144 that includes a conversation component 145. Specifically, CCM engine 142 may evaluate the design 130 to determine the content referenced by the templates 131, 132, 135, retrieve the referenced content from enterprise data source 116, external data sources 122 or other data source and render this content into conversation-enabled document 144 that includes a conversation component 145, such as a representation of template 132 (including node templates 135).

Processing of design 130 can include for example pulling sourced data into conversation-enabled document 144. Sourced data can be pulled into the conversation-enabled document 144 through network connections to enterprise data source 116, external data source 122, or other information sources. Of course, it should be understood that the data, whether from enterprise data source 116, external data source 122, or from another data source, could be content such as text, graphics, controls or sounds. It should be noted that many data sources can supply data input to the conversation-enabled document 144. It may be noted too, that the sourced data of conversation-enabled document 144 may include multiple data values for a given variable. For example, if the variable V_Cust_Num in design 130 maps to a Cust_Number column in a customer database, CCM engine 142 may pull in the customer number values for every customer in the database.

The output conversation-enabled document 144 may be in one of a number of formats, including a CCM system proprietary format. According to one embodiment, conversation-enabled document 144 is not a communication that the end-user (e.g., customer) sees, but is an internal representation (e.g., an in-memory (volatile memory) representation) of all the data and design elements used to render to the supported outputs. Conversation-enabled document 144, for example, may include various components of design 130 and sourced data. Using the example, in which design 130 includes hundreds of correspondence templates, conversation-enabled document 144 can include these templates and the sourced data referenced in or corresponding to variables in those templates. Document 144 can be programmed based on, for example, sourced data to generate the correct letters for any given set of data.

CCM engine 142 may process conversation-enabled document 144 to render conversation-enabled document 144 to a variety of supported formats (e.g., email output, print output, web page output or other output) based on the design 130. For example, CCM engine 142 can render a mortgage statement document into an AFP format which can be immediately printed and mailed to the end user, an email that can be immediately emailed to the end user and an HTML file that can be stored as web content so that the end user can access their statement on the enterprise's website. Other output formats may also be supported.

According to one embodiment, CCM engine 142 renders conversation-enabled document 144 as a conversation-enabled interactive document 150, which may be provided or stored as an interactive document container with operative components in a predetermined electronic file format. The interactive document container may comprise a pre-defined set of files that provides an atomic unit and enables interactive documents to be processed by enterprise applications. The interactive document container may include for example, but is not limited to, a compressed or zipped portion for storing predetermined components.

As will be appreciated, conversation-enabled interactive document 150 may be provided according to a variety of formats. In one embodiment, the conversation-enabled interactive document 150 may be provided as a web-intrinsic interactive document container, as described in U.S. Pat. No. 10,223,339, entitled "Web-Intrinsic Interactive Document," by Pruitt et al., issued Mar. 5, 2019, which is hereby fully incorporated by reference herein, where the web-intrinsic interactive document container further contains conversation component 160.

According to one embodiment then, production server 106 can translate design 130 provided by the designer 125 into an interactive document container, by translating the abstract description into a specific document layout. This translation process can include translating the design 130 into specific HTML tags and CSS directives, which are included in the document container. The combination of tag type semantics and CSS style directives creates a document that is an accurate representation of the document's design 130 in a web-intrinsic form. In addition, the interactive functions specified in the abstract design are translated to JavaScript and included in the document container. Support files containing custom data (e.g., variables and sourced data) are included in the document container and written in a format such as JavaScript Object Notation (JSON), for example. Moreover, production server 106 may translate the conversation component (e.g., conversation template and node templates) into a particular format, such as an XML file embodying JSON node template objects. Production server 106 can include the conversation file in the interactive document container as conversation component 160.

In another embodiment, the interactive document may be deployed as superactive document, such as described in U.S. Pat. No. 9,201,854, entitled "Methods and Systems for Creating, Interacting With, and Utilizing a Superactive Document," issued Dec. 1, 2015, which is hereby fully incorporated by reference herein for all purposes, where the superactive document container further includes a conversation component.

In any event, conversation-enabled interactive document 150 may be interacted with by conversation participants (e.g., conversation participate 175) (e.g., customers) and editor-users (e.g., customer-facing employees of an enterprise), such as editor-user 165. Conversation-enabled interactive document 150 may be utilized in a number of processes implemented by the enterprise. Print and electronic versions of such an interactive document may be provided in addition to processing of the interactive document by computer-implemented processes of the enterprise.

The underlying infrastructure of one embodiment of conversation-enabled interactive document 150 is represented by content 152, logic 154, document variables 156, conversation-enabled document data 158, and conversation component 160. Conversation-enabled interactive document 150 may include other components.

Content 152 may include, for example, page templates containing content specified by interactive document page templates of design 130. Content 152 may further include, for example, content objects such as images, audio files or other resources that can be incorporated into pages or conversation steps when the pages or steps are rendered.

Logic 154 can include logic related to pages, such as logic to control which portions of pages are editable, how the page changes as content in the page is edited and other logic.

Document variables 156 include variables specified in design 130 (e.g., variables referenced in content 152, logic 154 or conversation component 160) and included in conversation-enabled interactive document 150.

Conversation-enabled document data 158 may include data values for variables 156. In some embodiments, conversation-enabled document data 158 may include values for variables segregated by customer. For example, conversation-enabled document data 158 may include customer records for multiple customers sourced from enterprise data source 116, data sourced from external data source 122, default values specified in design 130 or other data.

Conversation component 160 is configured to control a conversation interface into conversation-enabled interactive document 150 and to drive conversations (e.g., web chat, SMS based conversation, audio-based conversation or other interactive conversation) with conversation participants. Conversation component 160 may be a representation of conversation template 132, including node templates 135. Conversation component 160 may be embodied in a variety of formats. According to one embodiment, conversation component 160 comprises an XML file that includes a representation of each of the node templates 135 (for example, includes the JSON for each node template 135 in conversation template 132).

Conversation component 160 may specify, for example, conversation prompts, variables (e.g., from variables 156) to which response data received from a conversation participant is to be written, variables (e.g., from variables 156) to pull data for prompts or logic (e.g., variables to pull data from conversation-enabled document data 158 or other sources), data types, messages to provide when particular events occur, rules on responses, validation, routing or other aspects of a conversation. Conversation component 160 may include or reference various content objects (e.g., images, audio files), document variables, data mappings or other objects for use in conversations.

Conversation-enabled interactive document 150 provides conversation and controlled editing experiences and changes based on interactions by conversation participants 175 or editor-user 165. Data that is entered by the conversation participant 175 or editor-user 165 during interactions can also be sent back to a database to be available for future interactions with a customer, for example. For example, data entered by the conversation participant 175 or editor-user 165 may be added to conversation-enabled document data 158.

As discussed above, conversation component 160 can be used to control a conversation interface into conversation-enabled interactive document 150. Such a conversation interface may be provided via any supported conversation channel. Conversation component, according to one embodiment, is conversation platform agnostic. As such, the conversation-enabled document 150, according to some embodiments, can be exposed to heterogeneous conversation platforms, such as various chatbot, voice assistant platforms, social media platforms or other platforms that support automated conversations with end users.

Based on conversation component 160, interactive document system 110 can provide prompts to any supported conversation platform configured to interact with user system 120 (e.g., which may be a telephone, computer system or other user system). Interactive document system 110 can receive conversation responses 180 from the conversation platform, which can be used to create or change conversation-enabled document data 158 that fills variables that have been set in design 130.

The conversation responses 180 and may affect how interactive document system 110 manifests conversation-enabled interactive document 150 to editor-user 165. More particularly, the pages, content or other aspects of conversation-enabled interactive document 150 displayed (e.g., variable values, text, images) to editor-user 165 may be based on variable values set by conversation responses. For example, user responses during a conversation may result in conversation-enabled interactive document 150 being rendered as a particular type of letter template with certain content (e.g., variable values, text, images) populated based on the conversation responses represented in conversation-enabled document data 158.

As editor-user 165 interacts with conversation-enabled interactive document 150, editor-user 165 can create or change conversation-enabled document data 158 that fills variables that have been set in design 130 and change page content that was designated as editable in design 130. For example, an editor-user 165 might enter their name, and begin to personalize a letter to be sent to a customer (e.g., conversation participant 175). In some cases, this may occur after the conversation has terminated.

The editor-user 165 may populate information, and perhaps change some imaging within conversation-enabled interactive document 150, for example. As a result, the conversation-enabled document data 158 or content 152 that is changed as part of the interaction is also stored and filed as part of conversation-enabled interactive document 150.

The manner in which editor-user 165 can change, format or otherwise edit content of conversation-enabled interactive document 150, or otherwise interact with conversation-enabled interactive document 150 is set in the document design process. Conversation-enabled interactive document 150 is then utilized and manipulated by the editor-user 165 in accordance with the design 130. Any actions taken by the editor-user 165 interactively may be dictated by the design 130.

It can be noted that, in some embodiments, the edited conversation-enabled interactive document 195 (e.g., conversation-enabled interactive document 150 as changed based on one or more conversations or one or more editing sessions) can be sent back to CCM engine 142 to be rendered in other formats supported by design 130 (e.g., as email, print, or other format).

As discussed above, a conversation with one end user (e.g., conversation participant 175) may affect how a conversation-enabled interactive document 150 is rendered to another end user (e.g., editor-user 165). The manner in which a conversation changes conversation-enabled interactive document 150 (or a customer communication) may be governed by design 130 from which conversation-enabled interactive document 150 is created.

Figure 2:
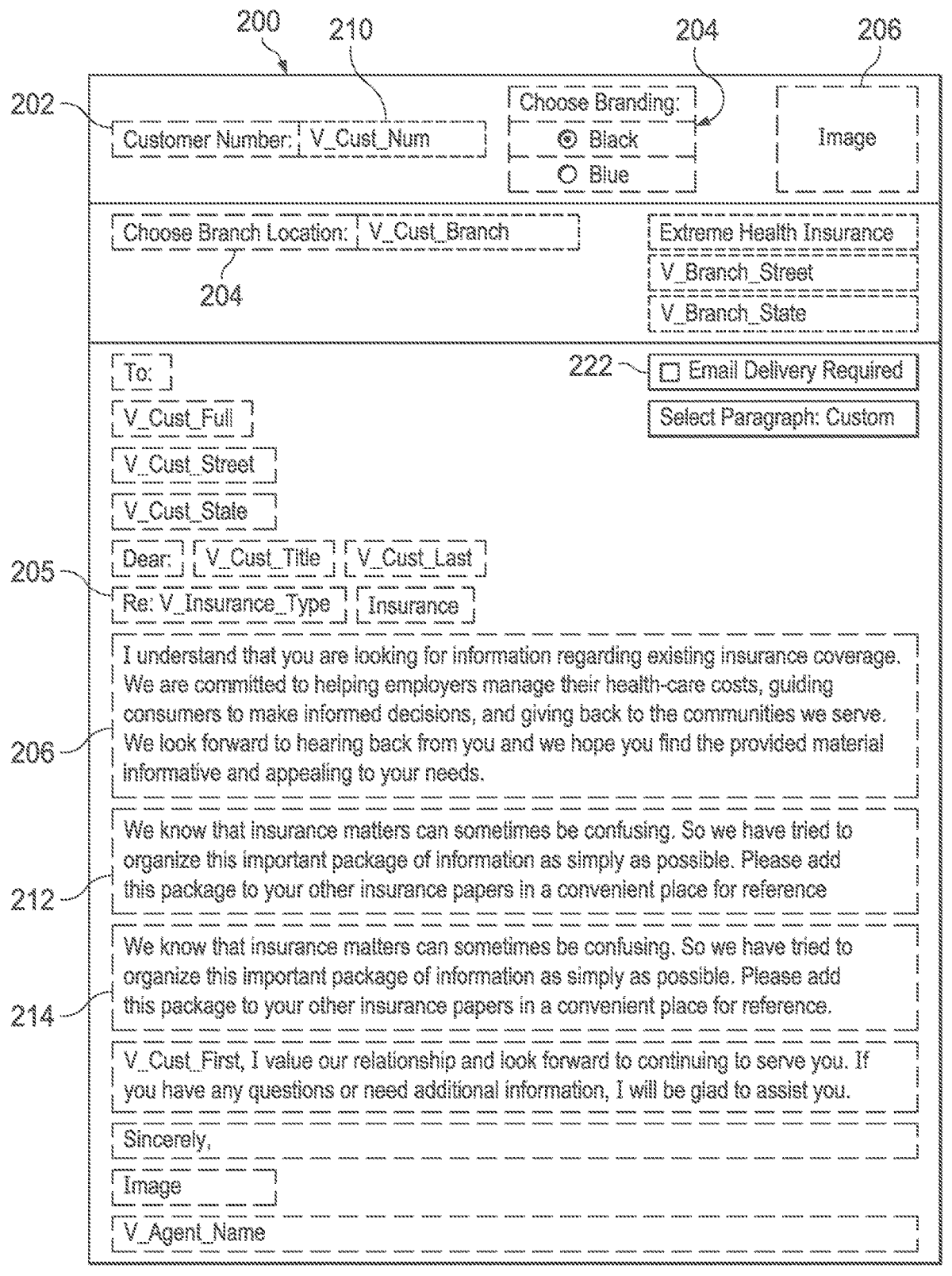

Turning briefly to FIG. 2, this figure illustrates one embodiment of designing an interactive document page template 200, which can be represented by a corresponding page object in design data store 104. Page template 200 may be associated with a usage rule indicating whether the page should appear within an interactive document (e.g., conversation-enabled interactive document 150). Page template 200 can specify components of a page. These components can also be governed by usage rules indicating whether or not they will appear on a page.

In this example, the document design application provides tools to allow a user to designate text boxes (e.g., text box 202), controls (e.g., buttons 204, checkboxes, dropdown lists and other controls), image boxes (e.g., image box 206), variables for text boxes (e.g., V_Cust_Num in box 210), variables used in usage rules, variables used to select page content and other aspects of a page. Certain text or image boxes may be designated as non-editable and others as editable. For example, text boxes 212 and 214 may be designated as editable and the others as non-editable.

For various controls, the design application 124 can provide tools to allow the designer to designate output for the controls. Design application 124 can further provide tools to allow the design to associate text boxes, image boxes, controls, pages and other objects with rules. For example, the designer-user 125 may specify a rule for image box 206 that, if the radio button Black is selected, image box 206 will be populated with a first image and if the radio button blue is selected, image box 206 will be populated with a second image. The designer-user 125 may also associate various portions of page template 200 with views, for example, such that control 222 appears when the document is rendered to an editor-user, but not when the document is rendered as an email output.

It can be noted that a document design may include multiple pages and page selection logic used to determine if a particular page will be available in a manifestation of the document. For example, document design 130 may include a page related to providing insurance product information and page selection logic configured to only make the page available when a variable value for a customer indicates that the customer is interested in insurance (V_Cust_Insurance=True). Further, certain information in a page may be populated based on variables. In the example of FIG. 2, the variable V_Insurance_Type may be used to populate part of the subject line 205.

The document design application 124 also provides a conversation design tool to allow a designer 125 to design a conversation to control a conversation interface into the conversation-enabled document. Specifically, in one embodiment, designer 125 at designer system 102 may utilize design application 124 to design node templates and conversation templates that comprise node templates. The designer can use the same suite of tools as they would to design any other templates and can reuse content, variables and variable data used by other templates or designs.

Figure 3A:
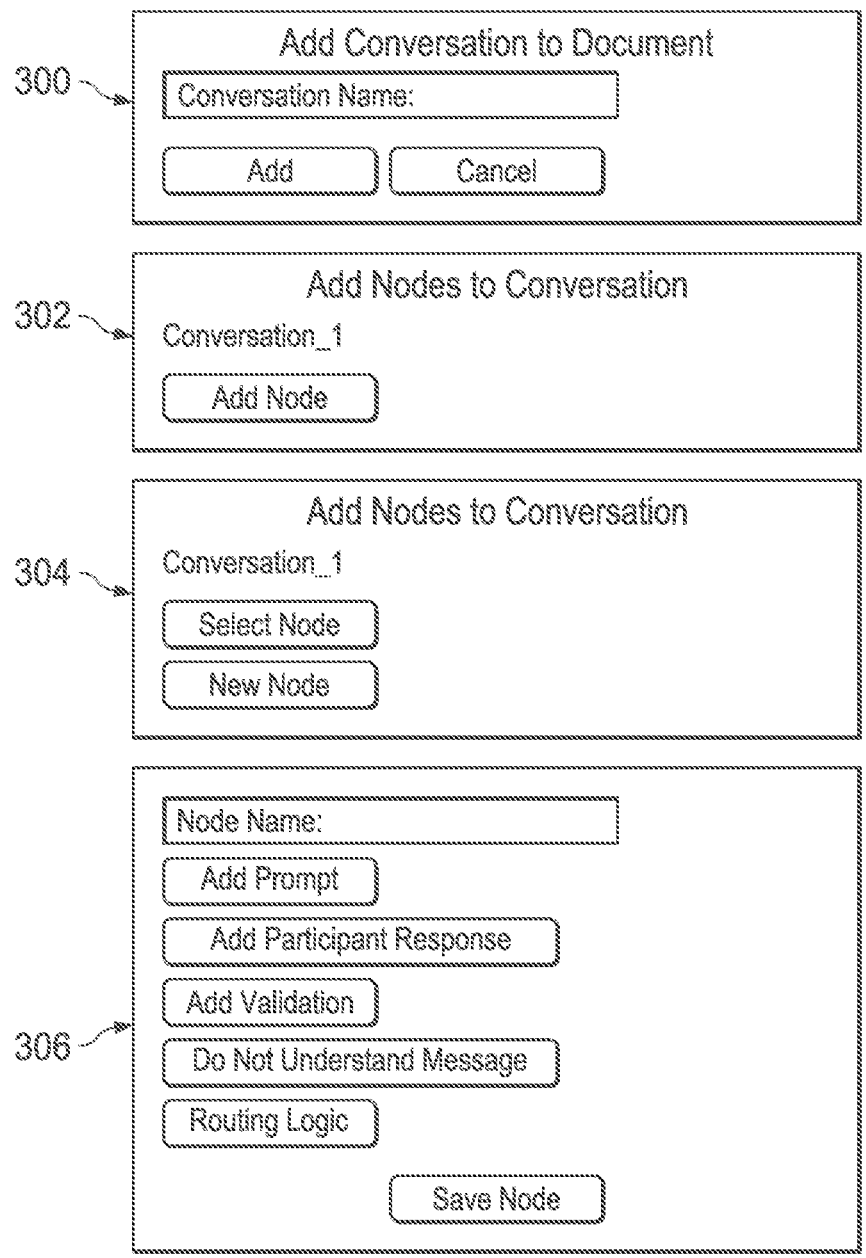
FIG. 3A is a diagrammatic representation of a user interface for designing a conversation.
Figure 3B:
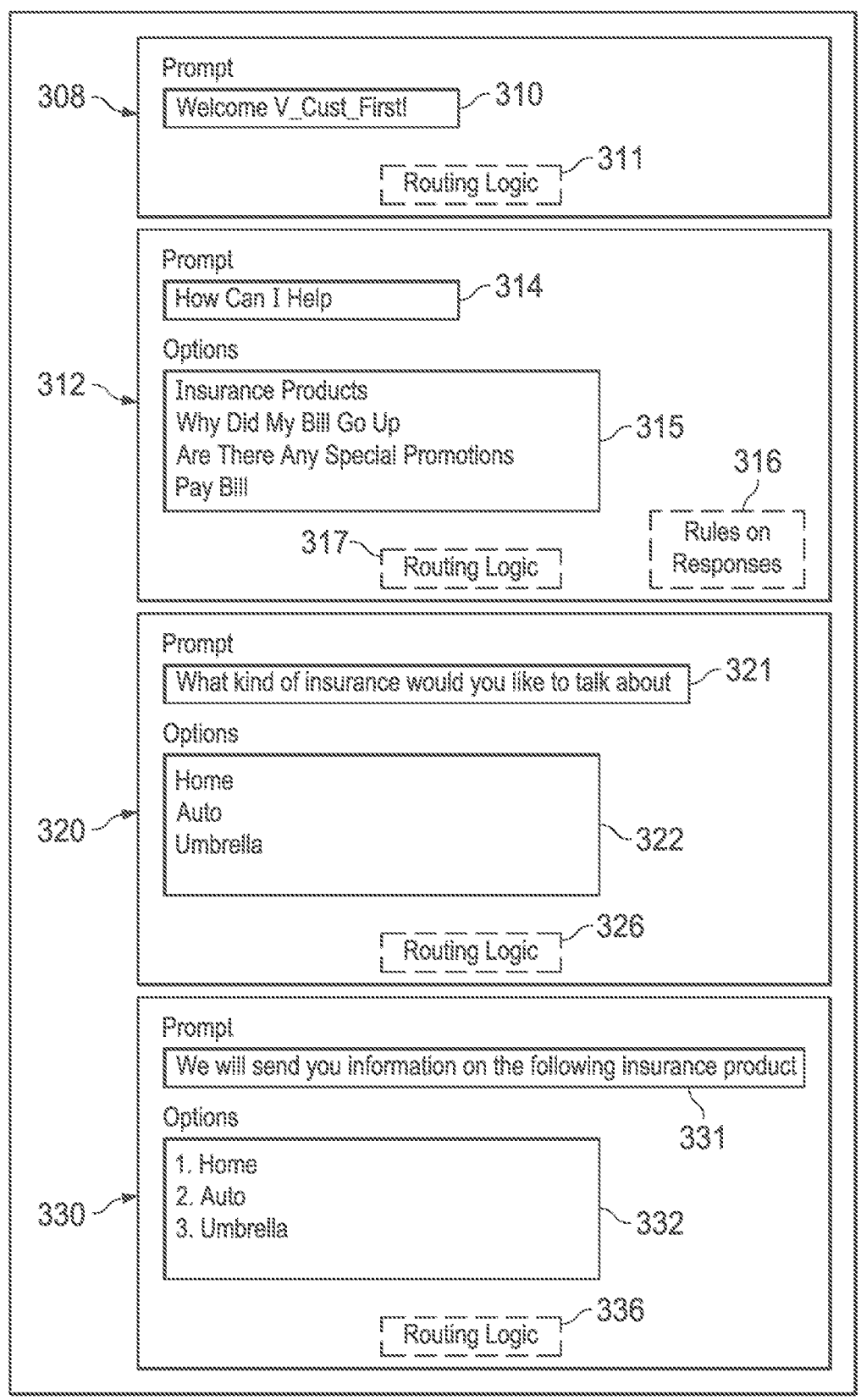
FIG. 3B is a diagrammatic representation of example node templates added to a conversation template in a design interface.
Figure 3C:
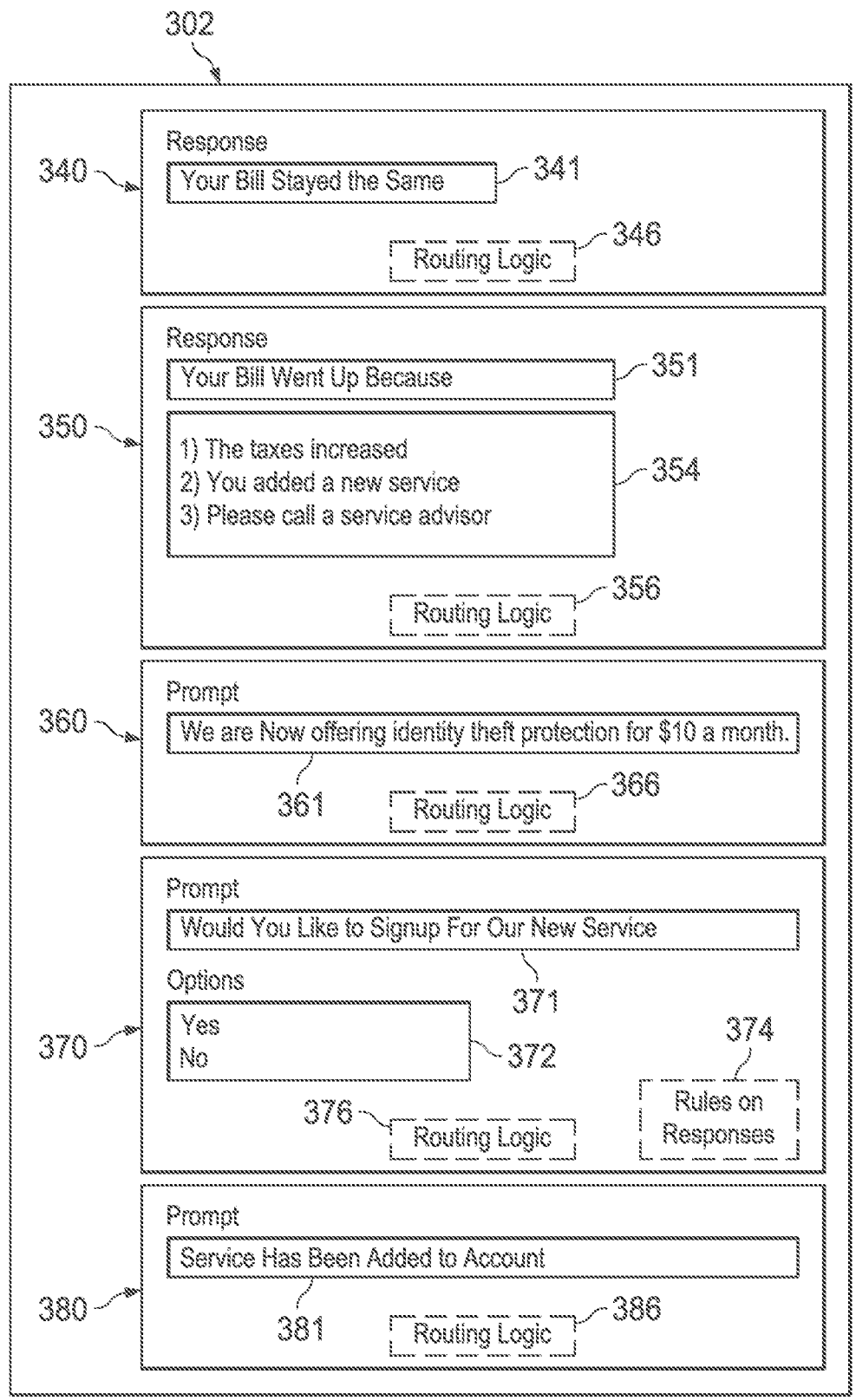
FIG. 3C is a diagrammatic representation of additional example node templates added to a conversation template in a design interface.

Turning briefly to FIG. 3A, FIG. 3B and FIG. 3C, the document design application 124 can provide a graphical user interface 300 that allows a user to create a new conversation template and add the conversation template to a design (e.g., design 130). The conversation template may be embodied in a conversation object in the document design environment.

Document design application 124 further provides a graphical user interface 302 to allow a user to add node templates to a selected conversation template. Clicking on the "Add Node" button can open a conversation design interface 304. Clicking on the "Select Node" button, can cause the conversation design interface to provide a node picker that allows the designer to select and edit existing node templates. Thus, node templates in a design data store may be reused between designs.

Clicking on the "New Node" button can cause the node design interface to provide new node design interface 306 that includes tools to allow a designer to configure various aspects of a node template. According to one embodiment, clicking on the "Add Prompt" button opens a tool to allow a designer to specify a prompt for the node template being designed. A node template may specify several prompts.

In general, a prompt defines the text, audio or other output a conversation platform (e.g., chatbot, voice assistant, IVR system) should output for a step in a conversation. Prompts may be simple text or can incorporate variables and logic so that the prompt may vary based on context. In some cases, a node may include multiple prompts, including, but not limited to an entrance prompt or an exit prompt for the node.

As discussed above, a prompt may include variables or logic. For example, a prompt may include various prompt options and logic to select a prompt option based on the value of a variable. For a system that supports audio-based conversations, the prompt tool may allow the designer to upload an audio file in addition to or as an alternative to providing text.

In some cases, the designer-user may specify a finite number of prompt options for a node. For a system that supports audio conversations, node prompt options may be provided as audio files in addition to or as an alternative to text.

Clicking on the "Add Participant Response" button can open an add participant response tool that allows a designer to enter a participant response definition. The participant response definition may include input controls such as buttons, check boxes, lists, text entry fields or other controls that allow an end-user to input a response during a conversation. In some cases, the designer-user may specify a finite number of participant response options for a node. In some embodiments, the add participant response tool may support uploading audio files for response options.

The add participant response tool may also allow the designer to specify the variables to which response data received from a conversation participant is to be written and the data type expected to be received for the variables (number, enum, string, etc.).

The add participant response tool may further allow the designer to add rules on responses. Rules on responses may include rules to execute based on a conversation participant's selection of a response option. A rule on a response may be specified, for example, in a scripting language.

Clicking on the "Add Validation" button can open an add validation tool. The add validation tool can allow the designer to add validation rules. Validation rules include expressions or code to validate conversation participant response data.

Clicking on the "Do Not Understand Message" button can open a "do not understand" message tool to allow the designer to add a "do not understand" message to a node. A "do not understand" message is a message to be provided if conversation participant response data for a variable is not of the proper data type for the variable, the input data cannot be validated or the input data otherwise is considered not understandable based on a rule. For a system that supports audio conversations, the "do not understand message" tool may allow a "do not understand message" to be provided as an audio file in addition to or as an alternative to text.

Clicking on the "Routing Logic" button can allow the designer to add routing logic. Routing logic can include rules regarding which node to route to next. A routing rule may be, for example, an expression or code. The routing logic may fetch data from enterprise data sources or external sources to determine a next node to go to and, in some cases, values to pass the next node. Routing logic may also kick off other processes, such as displaying web pages with desired information.

In some embodiments, a conversation is embodied as a conversation object that references a plurality of node objects. For example, the conversation and nodes may be persisted as JSON objects.

It can be noted that, in some embodiments, prompts or other messages associated with a node may be attached as audio files. Furthermore, various conversation participant options may be mapped to integers (e.g., so that a user can select such options using a phone pad).

Figure 4:
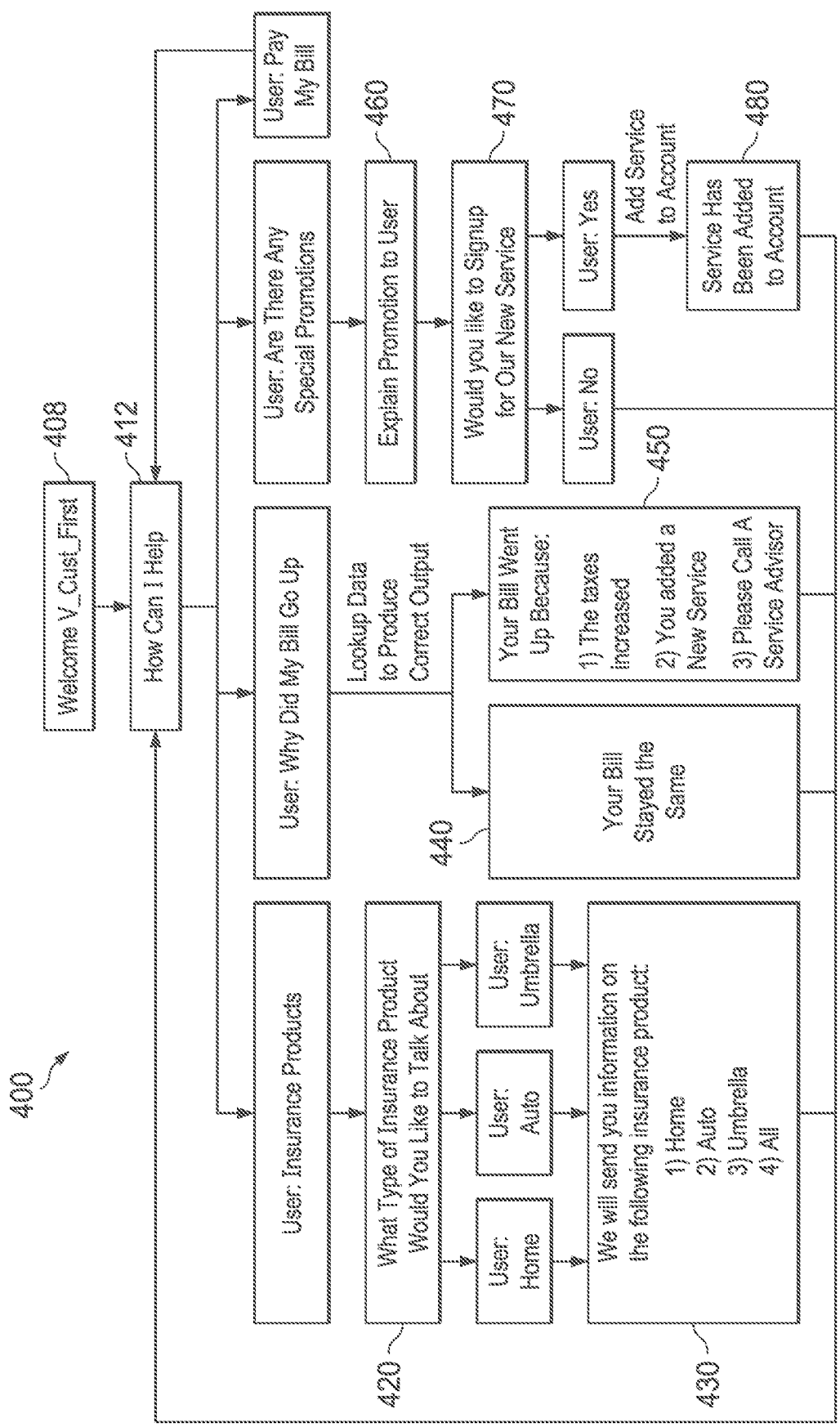
FIG. 4 is a diagrammatic representation of an automated conversation.

FIG. 3B and FIG. 3C illustrate diagrammatic representations of some example node templates added to a conversation template in a design interface 302. FIG. 4 illustrates an embodiment of a conversation 400 comprising nodes that embody the node templates of FIG. 3B and FIG. 3C. As discussed below, node templates may be used to create nodes in a conversation graph.

Node template 308, in this example, provides the definition for a root node 408 of conversation 400 and specifies a prompt 310 and routing logic 311. In this case, prompt 310 incorporates the variable V_Cust_First. Routing logic 311 can specify that the conversation should route to the node corresponding to node template 312 (e.g., node 412).

Node template 312 includes prompt 314, participant response options 315, rules on responses 316 and routing logic 317. The response options may set the value of a variable (e.g., sets a V_Help_Option to 0-3 depending on the option selected) which can be used by rules on responses 316 and routing logic 317 of node template 312. For example, rules on responses 316 may include code that specifies that if V_Help_Option=0, corresponding to a selection of "Insurance Products," a variable should be set for the end user (e.g., customer), such as V_Insurance_Interest:true.

Rules on responses 316 may further include code that specifies that, if V_Help_Option=1, corresponding to a selection of "Why Did My Bills Go Up," to make a web service call to an enterprise application (e.g., to enterprise data source 116) for information that can be used to determine why the bill went up. The code can be configured to output a value to a variable based on the determination of why the bill went up (e.g., if no bill increase, V_Bill_Increase=0; if the bill increase was due to taxes, V_Bill_Increase=1; if the bill increase was due to a new service being added, V_Bill_Increase=2; if reason for bill increase cannot be determined, V_Bill_Increase=3).

Rules on responses 316 may further include code to specify that if V_Help_Option=3, corresponding to a selection of "Pay Bill", to open a web page to allow the conversation participant to pay his or her bill.

Routing logic 317 of node template 312, and hence node 412, may specify that if V_Help_Option=0 the conversation should route to the node corresponding to node template 320 (e.g., node 420). Routing logic 317 may further specify that if V_Help_Option=1, corresponding to a selection of "Why Did My Bills Go Up," and V_Bill_Increase=0, the conversation should route to the node corresponding to node template 340 (e.g., node 440); if V_Help_Option=1, corresponding to a selection of "Why Did My Bills Go Up," and V_Bill_Increase>0, the conversation should route to the node corresponding to node template 350 (e.g., node 450); if V_Help_Option=2, corresponding to a selection of "Are There Any Special Promotions," the conversation should route the node corresponding to node template 360 (e.g., node 460); if V_Help_Option=3, corresponding to a selection of "Pay Bill," the conversation should return to the node corresponding to node template 312 (e.g., node 412).

Node template 320 includes prompt 321, response options 322 and routing logic 326. Each input option may be configured to set a corresponding value on a variable (e.g., V_Insurance_Type). The routing logic 326 of node template 320, and hence node 420, can specify that the conversation should route to the node corresponding to node template 330 (e.g., node 430).

Node template 330 includes prompt 331, prompt 332 comprising multiple prompt options and option selection logic and routing logic 336. Prompt 332 may specify, for example, that each prompt option corresponds to a value of a variable (e.g., V_Insurance_Type). Thus, depending on the value of the variable, node 430 will output the appropriate prompt option. The routing logic 336 of node template 330, and hence node 430, can route back the node corresponding to node template 312 (e.g., node 412).

Node template 340 includes prompt 341 and routing logic 346. The routing logic 346 can specify that the conversation should return to the node corresponding to node template 312 (e.g., node 412).

Node template 350 includes prompt 351 and prompt 354 comprising prompt option selection logic and prompt options. Prompt 354 may be configured such that each prompt option corresponds to the value of a variable. For example, "The taxes increased" may correspond to (e.g., V_Bill_Increase=1, "You added a new service" may correspond to V_Bill_Increase=2," and "Please call a service advisor" may correspond to V_Bill_Increase=3. Thus, depending on the value of the variable V_Bill_Increase, node 450 will output the corresponding prompt option. The routing logic 356 of node template 350 can specify that the conversation should return to the node corresponding to node template 312 (e.g., node 412).

Node template 360 includes prompt 361 and routing logic 366. The routing logic 366 of node template 360 can specify that the next node is the node corresponding to node template 370 (e.g., node 470).

Node template 370 includes prompt 371, response options 372, rules on responses 374 and routing logic 376. The response options 372 may set the value of a variable (e.g., sets a V_New_Service to true or false depending on the option selected) which can be used by rules on responses 374 and routing logic 376 of node template 370. According to one embodiment, rules on responses 374 can include code that is configured to make a web service request to add the new service to the conversation participant's account if it is determined that V_New_Service request=true and set a variable V_Service_Added=true when the service has been successfully added. The rules on responses 374 may incorporate various variables. Routing logic 376 can specify that V_New_Service=False, the conversation should route to the node corresponding to node template 312 (e.g., node 412) and that if V_Service_Added=true the conversation should route to the node corresponding to node template 380 (e.g., node 480).

Node 380 includes prompt 381 and routing logic 386. Routing logic 386 can specify that the conversation should route to the node corresponding to node template 312 (e.g., node 412).

The conversation design of FIG. 3B and FIG. 3C defines a finite state machine that includes multiple states. Given any state, there are triggers to move to the next state. At any point, as defined by the conversation design (e.g., conversation template 132), a conversation can query different data to determine answers or other output to provide.

FIG. 4, for example, is a diagrammatic representation of a conversation 400 based on the conversation design of FIGS. 3B and 3C. Each node of conversation 400 may include a variety of data, including, but not limited to prompts (including prompt options and prompt option selection logic), variables to receive response data, a definition of what data to expect from an end-user (e.g., number, enum, string, Boolean, etc.), response options, variables that hold data used to determine which prompt option to present, validation logic for validating data received from an end-user, a message to provide to the end user if the system does not understand or cannot validate the data received from the end-user, routing logic or other logic. FIG. 4 also illustrates transitions between nodes.

Figure 5:
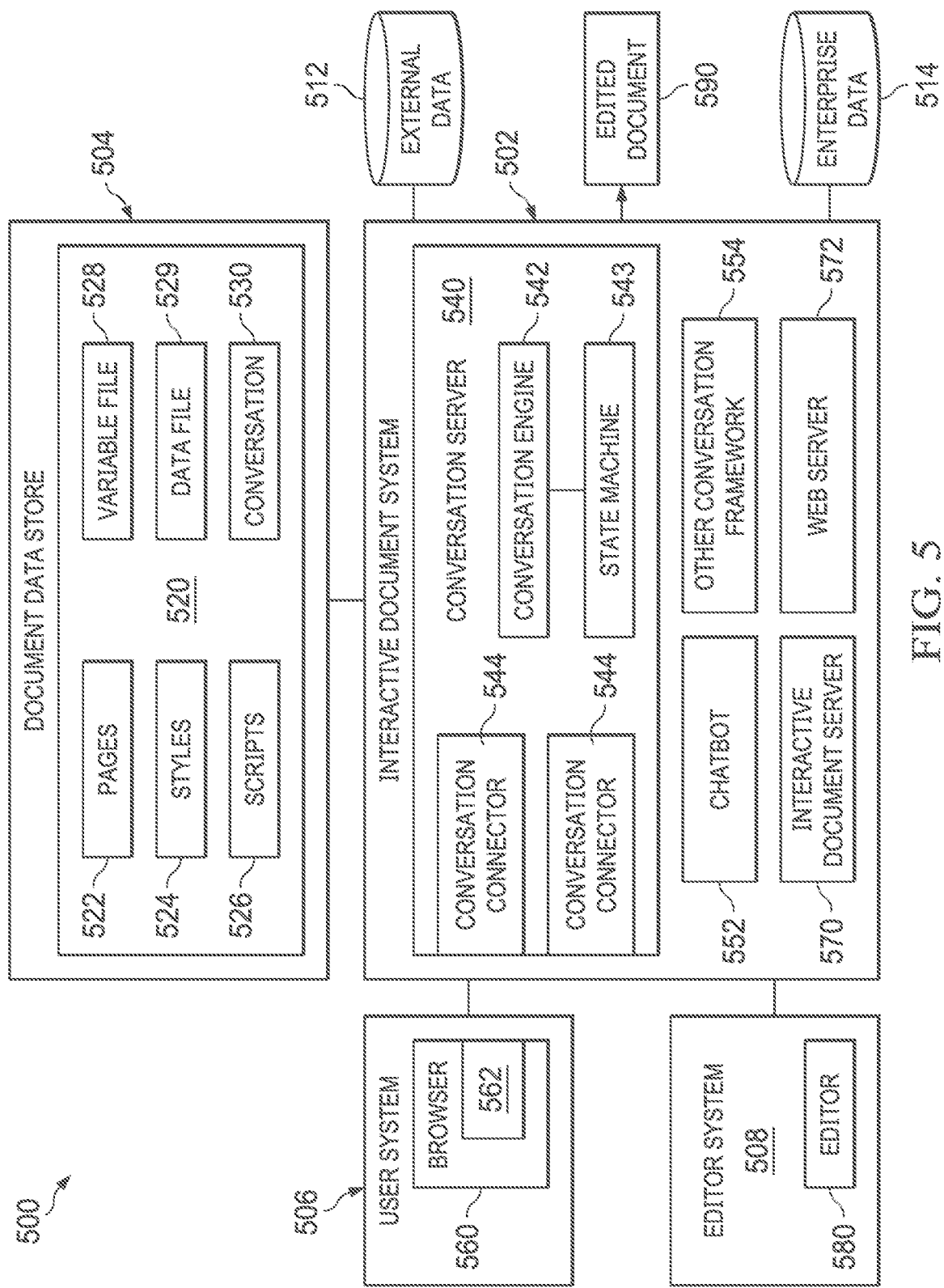
FIG. 5 is a diagrammatic representation of one embodiment of a conversation-enabled document processing system.

FIG. 5 is a diagrammatic representation of one embodiment of a document processing system 500 comprising a conversation-enabled interactive document system 502 coupled to a document store 504, enterprise data source 514, external data source 512, end-user (e.g., customer) system 506 and editor system 508. Conversation-enabled interactive document system 502 may be one embodiment of interactive document system 110. System 500 may be a distributed, networked computing environment comprising a plurality of computing systems or applications coupled through a network. The network may be the Internet, an intranet, a wireless or wired network, a local access network (LAN), a wide access network (WAN), a cellular network or some combination of these types of networks, or another type or types of networks.

In the illustrated embodiment, document store 504 includes a conversation-enabled interactive document 520, which may be one example of conversation-enabled interactive document 150. As discussed above, a production server (e.g., production server 106 of FIG. 1) can translate a design 130 provided by the designer 125 into a conversation-enabled interactive document container, by translating the abstract description into a specific document layout. This translation process can include translating the design 130 into specific HTML tags and CSS directives, which are included in the document container. The combination of tag type semantics and CSS style directives creates a document that is an accurate representation of the document's design 130 in a web-intrinsic form. In addition, the interactive functions specified in the abstract design are translated to JavaScript and included in the document container. Support files containing custom data (e.g., variables and sourced data) are included in the document container and written in a format such as JavaScript Object Notation (JSON), for example.

Thus, for example, conversation-enabled interactive document 520 may include a plurality of page templates as web pages 522, which may be written in HyperText Markup Language (HTML), eXtensible (XHTML), or any other suitable markup language. Each web page 522 may be associated with a corresponding style sheet 524 for describing the look and format of the corresponding web page 522. The style sheets 524 may be written in any suitable style sheet language, including Cascading Style Sheets (CSS) among others.

Conversation-enabled interactive document 520 may also include one or more programming scripts 526 that can control the behavior of one or more components of the various web pages. The programming scripts 526 may be written in any programming language, such as JavaScript. A document editor 580 may be included in the document 520 as one or more of the programming scripts. For example, programming scripts that make up the document editor 580 and may control the behavior of various data entry or selection components, such as text boxes, dropdown lists, and the like. Portions of conversation-enabled interactive document 520 content may be organized in the container in a file grouping. In effect, the conversation-enabled interactive document 520 can mirror a web site and may be directly accessible by a web browser.

The conversation-enabled interactive document 520 may also include one or more support data files (e.g., file 528 declaring variables and conversation-enabled interactive document data file 529 including sourced data values, such as customer records, default data values or other values for variables). It can be noted that customer records in interactive document data file 529, which may be one embodiment of conversation-enabled document data 158, may include columns for various variables that can be set for customers during a conversation or other interaction with conversation-enabled interactive document 520.

Conversation-enabled interactive document 520 includes conversation component 530 for controlling a conversation interface into conversation-enabled interactive document 520. In one embodiment, the translation process translates the conversation design (e.g., conversation template 132 of FIG. 1) into an XML representation of the conversation template.

Conversation-enabled interactive document system 502 includes a conversation server 540 that includes a conversation engine 542 and conversation connectors 544. Conversation-enabled interactive document system 502 may also include a chatbot 552 configured to provide a chat window 562 to a browser 560 at a user system 506 to allow a user (e.g., a customer or other conversation participant) to participate in an online conversation. Conversation-enabled interactive document system 502 may include other conversation channels. By way of example, but not limitation, conversation-enabled interactive document system 502 may include another conversation framework 554, which may comprise a different type of chatbot than chatbot 552, an IVR application, a voice assistant framework or other application capable of engaging in conversations with users.

Conversation engine 542 is configured to access conversation component 530 and generate an in-memory (in-volatile memory) graph of a conversation (a conversation graph) with the nodes of the graph generated from the node templates and the edges representing the transitions between nodes. The connectors 544 are configured to expose the conversation-enabled interactive document 520 on respective conversation channels. In particular, connectors 544 can parse the graph and translate the graph into the appropriate format for a conversation channel to provide a conversation interface.

Conversation connectors 544 can be deployed to support a variety of conversation channels including, but not limited to, chatbot frameworks provided by various providers, IVR systems, voice assistant frameworks and other conversation channels. Through the use of various connectors 544, conversation-enabled interactive document 520 can thus be exposed on any supported conversation channel.

Thus, conversation-enabled interactive document 520 may be agnostic to the conversation channel. For example, a conversation platform independent conversation-enabled document can be translated by a variety of connectors 544 to heterogeneous conversation channels, such as various chatbot channels, voice assistant channels, social media channels or other channels.

While chatbot 552 and the other conversation framework 554 are illustrated as a portion of conversation-enabled interactive document system 502, they may be external systems controlled by a different enterprise. In some embodiments, conversation connectors 544 may make conversations accessible via public APIs or other mechanisms.

In one embodiment, a conversation application, such as chatbot 552 sends a request to conversation server 540 to initiate a conversation for a user (conversation participant). The request may include information about the conversation participant, such as a customer identifier, customer name or other information and a document identifier or conversation identifier. The appropriate connector 544 sends the request to conversation engine 542, which loads the conversation component 530 based on the indicated document or conversation and initiates a finite state machine 543 for the conversation for the conversation participant (e.g., customer of the enterprise). According to one embodiment, conversation engine 542 parses the conversation component 530 to create an in-memory graph of the conversation in volatile memory, where the graph includes nodes that represent the steps of the conversation and the transitions between the nodes or steps. Conversation engine 542 may include, in the graph, variables referenced in conversation component 530 and the variable values for the customer (e.g., loaded from interactive document data file 529).

The conversation starts in the initial state. As a conversation participant (e.g., conversation participant 175) interacts or responds, the conversation nodes are interpreted, and the conversation moves along. The connector 544 can parse the node corresponding to the current state and convert the node into a format usable by the conversation application. The connector can further pass conversation participant responses to conversation engine 542 and conversation engine 542 can update the state of the conversation accordingly.

Using the example of chatbot 552 and conversation 400, in which at least a portion of conversation 400 is manifested in chat window 562, conversation 400 starts in an initial state corresponding to node 408. Conversation engine 542 can populate the value V_Cust_Name for the customer associated with the conversation request. For example, V_Cust_Name may have the value "Jane" for conversation 400. As such, the connector 544 for chatbot 552 parses the node 408 in the graph and converts the node into a format of the chatbot 552. For example, connector 544 may convert the prompt "Welcome Jane!" into the format used by chatbot 552 so that chatbot 552 can present an appropriate prompt in chat window 562.

When chatbot 552 requests the next step in the conversation, connector 544 may signal the conversation engine 542 and conversation engine 542 can execute routing logic (e.g., routing logic 311) to move to node 412. Connector 544 parses node 412 to provide the prompt and specified participant result options to chatbot 552 in a format consumable by chatbot 552.

Based on user interaction with a user interface, the user may respond to chatbot 552 and chatbot 552 can provide an indication of the conversation participant's response to connector 544. Connector 544 translates the response into a format usable by engine 542 and engine 542 executes the rules on responses (e.g., rules on responses 316) and routing logic (e.g., routing logic 317) of the current node to move the conversation to the next state, which will correspond to node 420, node 440, node 450 with the appropriate prompt option set, or node 460.

Connector 544 parses the node corresponding to the new current state to translate the prompt including, in the case of node 450, the appropriate prompt option, into a format consumable by chatbot 552. This process can continue as conversation 400 progresses.

Thus, as the user interacts/responds to steps in the conversation, the conversation moves along. As part of this process data collected from the conversation participant (e.g., based on user interaction with a user interface) can be stored in variables of the document (e.g., interactive document data file 529). Additionally, the conversation logic may query information from the document to be used to provide the data to the conversation participant or to determine other output to provide as a portion of the conversation. In some embodiments, conversation participant responses may be stored as variable values segregated by customer. By way of example, but not limitation, data collected from the conversation participant may be stored as variable values or be used to determine variable values that are stored to the customer record in conversation-enabled interactive document data file 529.

Conversation-enabled interactive document system 502 may further comprise an interactive document server 570 and a web server 572. Interactive document server 570 may be an application server. In the event that a client requests an interactive document, the interactive document server 570 retrieves conversation-enabled interactive document 520 from document store 504 and renders conversation-enabled interactive document 520 as a web-accessible interactive document. In some examples, interactive document server 570 populates the conversation-enabled interactive document 520 with content from the enterprise data source 514, external data source 512 or interactive document data file 529. Population of the interactive document can be accomplished using a rules engine, which is a set of JavaScript functions that when evaluated can perform a set of actions that typically set the value of variables, or can control whether sections of a document are revealed or hidden. The rules engine dynamically evaluates these JavaScript functions. A specific JavaScript function can test the value of a variable and depending on the function value can set the value of other variables. For example, these variables can represent simple values like a monetary value or a special value which triggers whether a HTML tag is shown. In some cases, the values of the variables may be read from interactive document data file 529 and include values set based on a conversation with a customer (e.g., based on conversation 400). Thus, the portions of conversation-enabled interactive document 520 revealed to an editor-user may depend on variable values set during a conversation.

For example, the document request may include one or more identifiers that identify the type of document being requested and other information that can be used to identify content to be included in the web-accessible interactive document. For example, the document request can include a customer identifier and a client identifier. Using the customer identifier, interactive document server 570 can retrieve information about the customer from the enterprise data source 514, external data source 512 or interactive document data file 529, such as the customer's name, account number, address, and the like. Using the client identifier, the interactive document server 570 can retrieve information about the client from the enterprise data source 514, such as an enterprise logo, for example. The document can be populated with the retrieved information in accordance with specifications of the design.

Interactive document server 570 may deploy the web-accessible interactive document in a structure that is conducive to web interaction. For example, interactive document server 570 may store conversation-enabled interactive document 520 to a database that stores content in a hierarchical parent-child form that closely matches the form of a website. Various components of the conversation-enabled interactive document 520 can map naturally to a web site. The document may be addressed by a web browser through a URL that identifies a root web resource (e.g., a root web page included in conversation-enabled interactive document 520). The root resource can contain links to additional resources, including additional sub-pages, style sheets, programming scripts, and data. Each of the additional resources can also be identified by a URLs or a Uniform Resource Identifier (URI).

Once the web-accessible interactive document is deployed, it can be accessed by the client computer (e.g., editor system 508, which may be an example of editor system 118) through a Web browser by addressing the document according to a Uniform Resource Locator (URL) assigned to the interactive document instance. The web server 572 can send the interactive document instance to the editor system 508. Web server 572 responds to requests from the web browser of the editor system 508 for each page of conversation-enabled interactive document 520. Each page may be addressable via a Uniform Resource Locator (URL) that uniquely identifies each component of the document. The interactive document may include a document editor 580 that is sent to editor system 508 and enables the interactive document instance to be edited. The editor 580 can be an application developed in a form native to the client computer's web browser and functions through Hypertext Transfer Protocol (HTTP) requests, such as GET, POST, PUT, and DELETE.

An editor-user can edit the interactive document instance by interacting with document editor 580. For example, the user may be able to add text to certain components of the document that are designated for receiving user text and add images to certain components of the document that are designated for receiving user specified images. Changes to the document are implemented through the HTTP methods. When the user is finished editing the document instance, the document instance may be placed into a workflow managed by an enterprise application. For example, the document may be sent to a designated customer and then stored to a document archive as a record of the customer transaction. The finished document may be stored in a web-intrinsic form that includes a number of files, such as HTML files, JavaScript files, CSS files, and JavaScript Object Notation (JSON), among others.

Figure 6:
FIG. 6 is a diagrammatic representation of a presentation of a conversation-enabled interactive document.

FIG. 6 is a diagrammatic representation of conversation-enabled interactive document 520 manifested to an editor-user (e.g., via editor 580) as a web page 600. In this case, it is assumed that John Doe, an agent of the enterprise, requested an interactive document to send correspondence to a user Jane Smith.

It is further assumed that, based on page usage rules of conversation-enabled interactive document 520, the editor-user is presented with a page 600 based on page template 200. In this case, certain information can be populated from interactive document data file 529, enterprise data source 514 or external data source 512. It is further assumed that Jane Smith previously participated in a conversation 400 that set a V_Insurance_Interest variable to true and a V_Insurance_Type variable to "Home" for Jane Smith in conversation-enabled interactive document 520 (e.g., in interactive document data file 529).

In this example, a document request may include a document identifier, a customer identifier (e.g., Jane Smith's customer number 11111111) and John Doe's agent identifier. Using the customer identifier, interactive document server 570 can retrieve information about the customer from the enterprise data source 514, external data source 512 or interactive document data file 529. In particular, interactive document server 570 can retrieve that V_Insurance_Interest=true and V_Insurance_Type=Home for Jane Smith and based on usage rules (e.g., as specified in design 130 and embodied in scripts 526), render document 520 as a web accessible interactive document that includes a web page based on template 200, populate the web accessible manifestation of conversation-enabled interactive document 520 with various data and present page 600 as the editor-user manifestation of conversation-enabled interactive document 520. Page 600 can thus be considered a manifestation or rendering of conversation-enabled interactive document 520, to the editor-user John Doe.

Here, page 600 is presented based on conversation participant responses. Furthermore, various portions of the conversation. In particular, the subject line 610 contains the value of the variable V_Insurance_Type stored for Jane Doe when Jane Doe participated in conversation 400. It can also be noted that page 600 can indicate that text areas 612 and 614 are editable.

The editor-user may thus add content to page 600 to edit conversation-enabled interactive document 520. The edited conversation-enabled interactive document 590 (e.g., conversation-enabled interactive document 520 with at least a portion of the document data in document data file 529 or document variable values otherwise set based on the conversation or interaction with an editor-user) can be returned to CCM engine 142 or other application for further processing. For example, CCM engine 142 may generate print, email or other outputs from edited conversation-enabled interactive document 590.

In various examples discussed above with respect to FIG. 5 and FIG. 6 it is assumed that the conversation-enabled document is exposed to one user for the conversation and another user for editing. In other embodiments, the conversation component may be configured to control a conversation interface into the document, where the conversation interface is presented to the editor user. For example, a conversation may be designed to elicit responses from an editor-user as the editor-user interacts with the conversation-enabled document. In such an embodiment, the document as presented in the document editor may change dynamically as the editor-user participates in the conversation.

Figure 7:
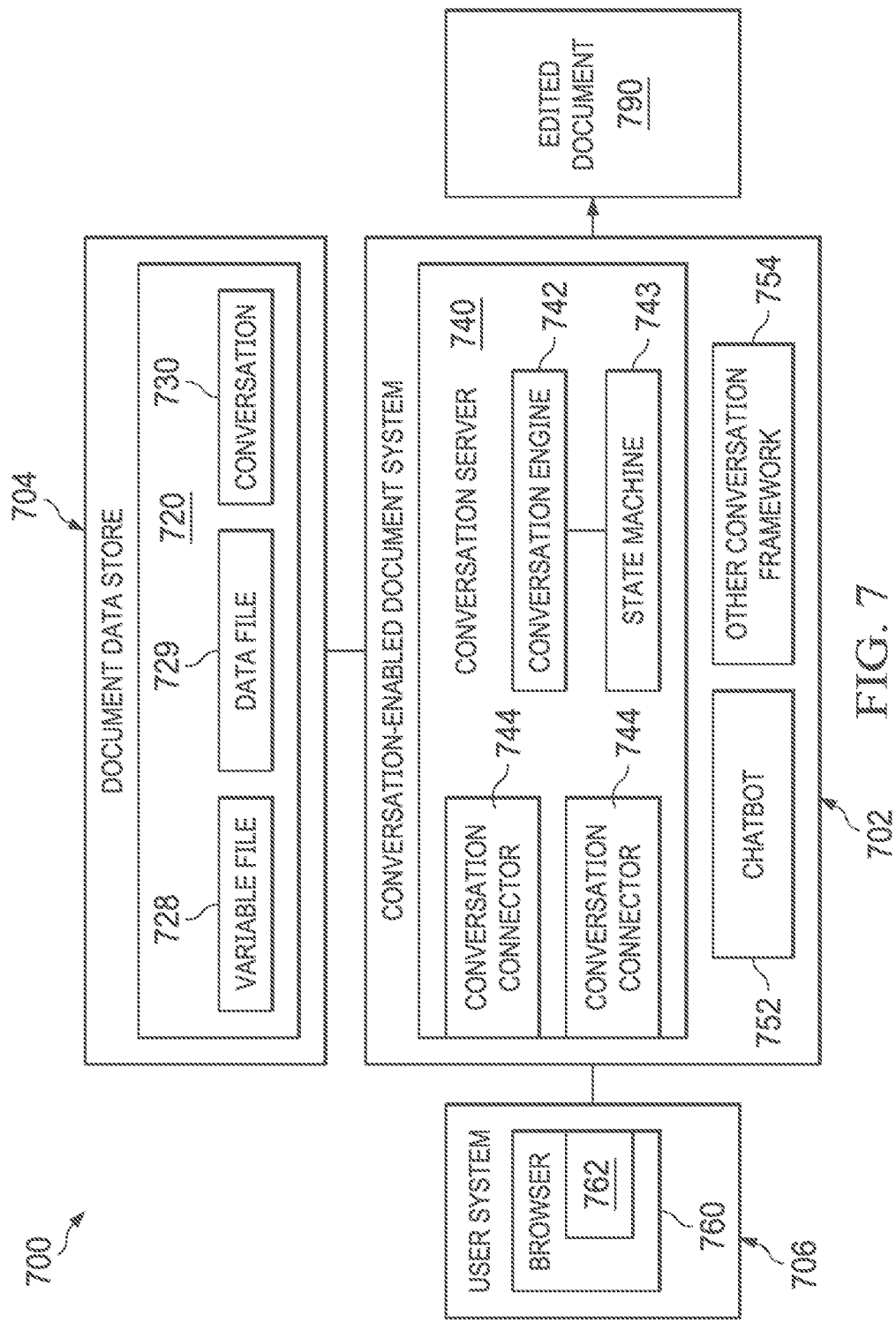
FIG. 7 is a diagrammatic representation of another embodiment of a conversation-enabled document processing system.

In the embodiment of FIG. 5, a conversation-enabled document is rendered as a conversation-enabled interactive document that includes various components such that the conversation-enabled interactive document can be manifested on a first channel as a conversation with a first user conversation channel and on a second channel as pages for editing by a second user. In other embodiments, however, a conversation-enabled document may be rendered as a conversation-enabled document with just the components to manifest the document as a conversation channel. Turning to FIG. 7, a diagrammatic representation of one embodiment of a document processing system 700 is provided. System 700 comprises a conversation-enabled document system 702 coupled to a document store 704, enterprise data sources, external data sources, and end-user (e.g., customer) system 706. System 700 may be a distributed, networked computing environment comprising a plurality of computing systems or applications coupled through a network. The network may be the Internet, an intranet, a wireless or wired network, a local access network (LAN), a wide access network (WAN), a cellular network or some combination of these types of networks, or another type or types of networks.

In the illustrated embodiment, document store 704 includes a conversation-enabled document 720. A production server (e.g., production server 106 of FIG. 1) can translate a design 130 provided by the designer 125 into a conversation-enabled document. The conversation-enabled document 720, according to one embodiment, may be provided or stored as a container with operative components in a predetermined electronic file format. The conversation-enabled document container may comprise a pre-defined set of files that provides an atomic unit and enables conversation-enabled documents to be processed by enterprise applications.

According to one embodiment, conversation-enabled document 720 includes one or more support data files (e.g., file 728 declaring variables and document data file 729 including sourced data values, such as customer records, default data values or other values for variables). It can be noted that customer records in conversation-enabled document data file 729 may include columns for various variables that can be set for customers during a conversation.

Conversation-enabled document 720 includes conversation component 730. In one embodiment, the translation process translates the conversation design (e.g., conversation template 132 of FIG. 1) into an XML representation of the conversation template.

Conversation-enabled document system 702 includes a conversation server 740 that includes a conversation engine 742 and conversation connectors 744. Conversation-enabled document system 702 may also include a chatbot 752 configured to provide a chat window 762 to a browser 760 at a user system 706 to allow a user (e.g., a customer or other conversation participant) to participate in an online conversation. Conversation-enabled document system 702 may also support other conversation channels. By way of example, but not limitation, may include another conversation framework 754, which may comprise a different type of chatbot than chatbot 752, an IVR application, a voice assistant framework or other application capable of engaging in conversations with users.

In general, conversation server 740 may operate as discussed above in conjunction with conversation server 540, for example, maintaining a finite state machine 743 for each conversation. Further like the embodiment of FIG. 5, participant responses can be used to populate document data. For example, conversation server 740 can use participant responses to populate variable values held in conversation-enabled document data file 729. The edited document 790 (e.g., conversation-enabled document 720 with at least a portion of the document data in data file 529 or variable values otherwise set based on a conversation) can be returned to CCM engine 142 or other application for further processing. For example, CCM engine 142 may generate print, email or other outputs from edited conversation-enabled document 790. For example, conversation-enabled document 720 may be an interactive PDF document with a conversation component integrated in the PDF and edited conversation-enabled document 790 may be the interactive PDF with pages selected or content populated based on conversation responses.

Figure 8:
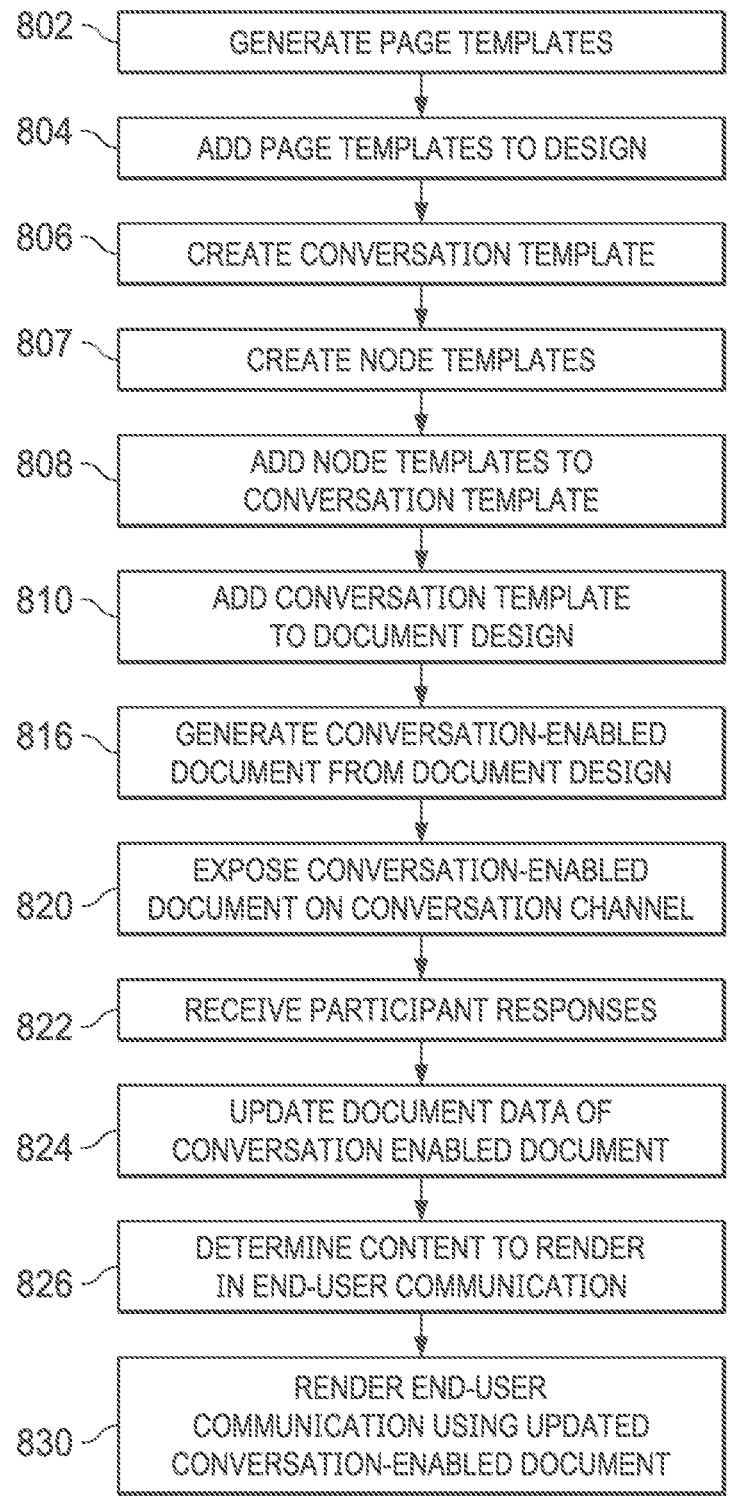
FIG. 8 a flowchart for one embodiment of a method for designing and using a conversation-enabled document.

FIG. 8 is a flowchart for one embodiment of designing and using a conversation-enabled document. Initially, at step 802, page templates may be generated. In one embodiment, users utilize a design application (e.g., which may be associated with a CCM system) to design templates including creating, or specifying, a number of associated objects (e.g., content items, variables, styles, logic settings, data mappings) associated with the templates. At step 804, the templates and associated objects may be added to a design.

At step 806, conversation templates may be generated. In one embodiment, users utilize a design application (e.g., which may be associated with a CCM system) to create a conversation template.

At step 807, node templates may be created. In one embodiment, users utilize a design application (e.g., which may be associated with a CCM system) to design node templates that specify prompts, variables, data types, messages to provide when particular events occur, rules on responses, validation logic, routing logic or other aspects associated with steps of a conversation. At step 808 node templates can be added to a conversation template using the design application. At step 810, a conversation template can be added to a document design using the design application.

At step 816, a conversation-enabled document may be generated from the document design. Specifically, the design may be processed to determine the content referenced by various templates, the reference content retrieved from data sources and the content rendered into the conversation-enabled document. Processing of the design can include, for example, pulling sourced data into the conversation-enabled document. Sourced data can be pulled into the document through network connections to enterprise data sources, external data sources, or other information sources.

The output conversation-enabled document may be in one of a number of formats, including a CCM system proprietary format. According to one embodiment, the initial conversation-enabled document is not a communication that the end-user (e.g., customer) sees, but is an internal representation (e.g., an in-memory representation) of all the data and design elements used to render to the supported outputs. The document may include, for example, various components of the document design and sourced data.

The conversation-enabled document may be rendered to a variety of supported formats based on the design. For example, the conversation-enabled document may be rendered as a conversation-enabled document that is in a format usable by a conversation server to expose the document to a conversation channel. In some embodiments, the conversation-enabled document may be rendered as a conversation-enabled interactive document.

According to one embodiment, the conversation-enabled document, is rendered as a conversation-enabled document comprising a pre-defined set of files that provide an atomic unit and enables conversation-enabled documents to be processed by enterprise applications.

At step 820, the conversation-enabled interactive document is exposed on a conversation channel (e.g., a chat channel, an IVR channel) or other conversation channel, thus providing a conversation interface into the conversation-enabled document.

At step 822, participant responses to a conversation are received. At step 824, the document data of the conversation-enabled document is updated based on the participant responses. For example, a value of a document variable may be set based on a conversation-participant response.

According to one embodiment, the conversation-enabled document may be rendered to another channel using the document variable and a page template. At step 826, the system (e.g., production server, interactive document system, conversation-enabled document system) may determine content of the content-enabled document to render to another channel based on the updated document data. The second channel may be a non-conversation channel.

At step 830, the updated conversation-enabled document is rendered to another channel using, for example, determined content, where the determined content may include a page template. For example, pages of a conversation-enabled interactive document may be displayed to an editor user for editing, where the page displayed is based on the document data that was updated (e.g., set or modified) during a conversation or the page displayed includes content selected based on the document data that was updated. In another example, the conversation-enabled document may be rendered as print output or email output, where the print output or email output comprises a page included based on the document data that was updated or a page of the print output or email output includes content that was selected based on the document data that was updated.

Thus, a value of a document variable may be set in the conversation-enabled document based on a conversation-participant response (step 824) and the conversation-enabled document rendered to another channel using the document variable and a page template (steps 826, 830). For example, the value of the document variable may be used to select the page template included in the conversation-enabled document or select or set content included in a page generated using the page template.

FIG. 8 is merely illustrative, and the disclosed subject matter is not limited to the ordering of or number of steps illustrated. Embodiments may implement additional steps or alternative steps, omit steps, or repeat steps.

Figure 9:
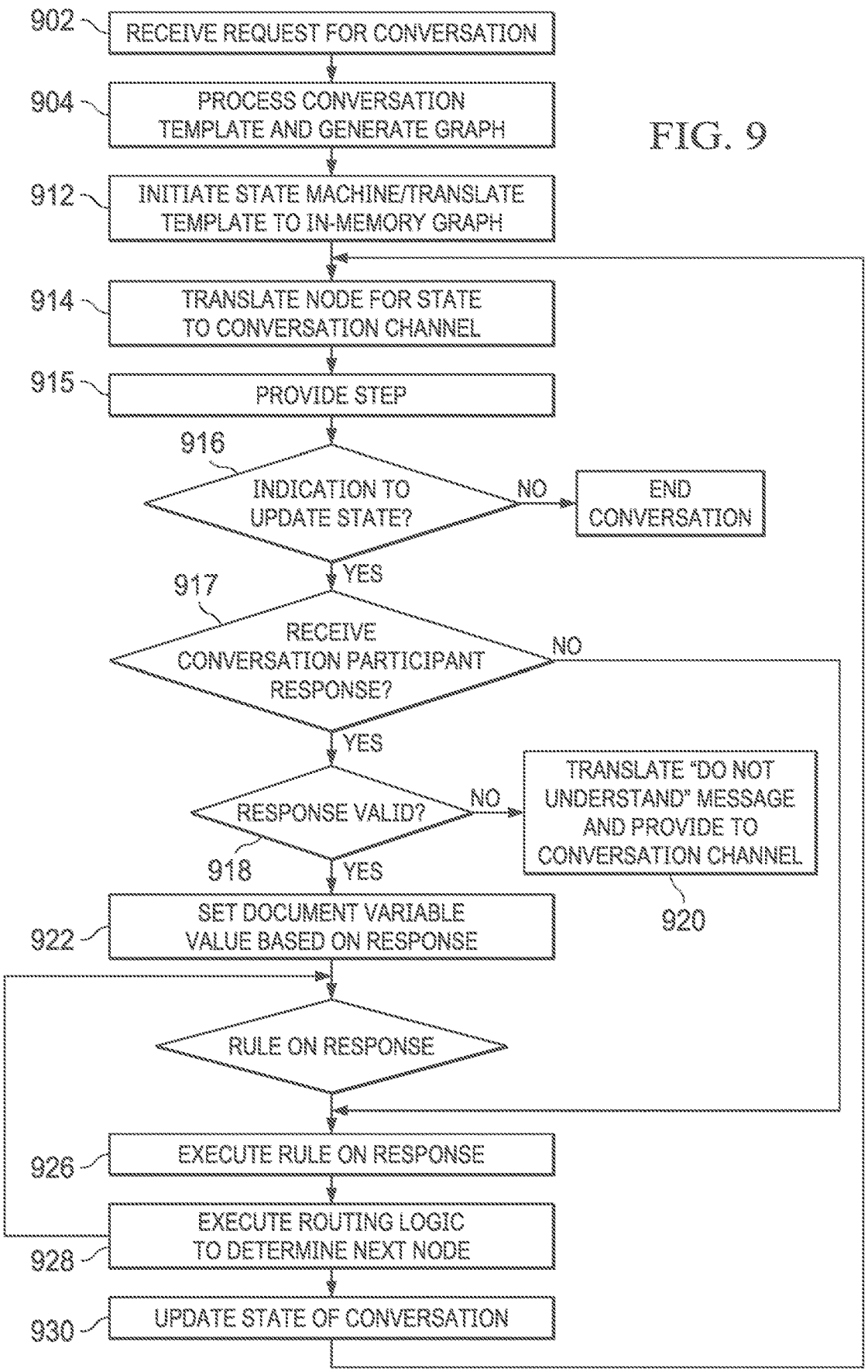
FIG. 9 is a flowchart illustrating one embodiment of a method for exposing a conversation-enabled document on a conversation channel.

FIG. 9 is a flowchart illustrating one embodiment of a method for exposing a conversation-enabled document on a conversation channel. The method of FIG. 9 may be carried out, for example, by a conversation server (e.g., conversation server 540, 740).

At step 902, a request for a conversation is received from a conversation framework. The request for a conversation may include indications of a conversation-enabled document and conversation participant. At step 904, a conversation-enabled document conversation template is loaded and traversed (e.g., a conversation component 160, 530, 730, which may represent a conversation template, is loaded and traversed). Traversing the conversation template may include reading node templates and generating an in-memory conversation graph including nodes created from the node templates. A node of a conversation graph may represent a step of a conversation and can hold, for example, prompts, variables, variable data, data types, messages to provide when particular events occur, rules on responses, validation, routing or other aspects of a conversation. In some embodiments, the variable values for some node variables (i.e., variables referenced by the node) may be populated initially using document data associated with the conversation participant that is contained in the conversation-enabled document when the conversation is initiated. The variable values of other node variables may be set during the conversation.

At step 912, a finite state machine is initiated for the conversation, where each state of the finite state machine corresponds to a respective node of the conversation graph.

At step 914, the node for the current conversation state is translated into a format consumable on a conversation channel. For example, prompts, possible participant responses, variable values or other data associated with the node can be packaged in a format consumable by a chatbot.

At step 915, step data is provided to the conversation channel. For example, the translated data associated with the current node is provided to the chatbot or another conversation framework.

In some embodiments, a conversation channel may indicate that the state of a conversation should progress. For example, a chatbot may return participant responses (e.g., a selection of a response option by a participant), request a next step or provide another indication that the conversation should progress. If no such indication is received (e.g., within a timeout period or based on rules) as determined at step 916, the conversation can be terminated.

If an indication to progress the state of the conversation is received, it can be determined if a conversation participant's response has been received. If a participant response is not received, as determined at step 917, the routing logic for the node can be executed.

If a participant response is received for the step (node), a determination can be made if the response is valid based, for example, on the data type expected to be received and validation logic associated with the current node (step 918). If the response is not valid, the "do not understand" message associated with the current node can be translated to a format consumable by the conversation channel and provided to the conversation channel (step 920).

If the participant response is valid, a document variable value can be set for the document variable specified in the current node to receive the conversation participant's response for the current step (step 922). In some embodiments, the value for the variable may be written to the document data of the underlying conversation-enabled document, for example written to the conversation-enabled document data 158, document data file 529, or document data file 729.

If a rule is defined on the response, the rule can be executed (step 926). The rule on response may set values on variables, which may be written to the document data, read values of variables from the document data (document data held in the underlying conversation-enabled document or in the in-memory graph representation), or implement other actions.

At step 928, routing logic is executed to determine the next node in the conversation, the state machine is updated to point to the next node and the method repeated for the next node (step 930).

FIG. 9 is merely illustrative, and the disclosed subject matter is not limited to the ordering of or number of steps illustrated. Embodiments may implement additional steps or alternative steps, omit steps, or repeat steps.

Figure 10:
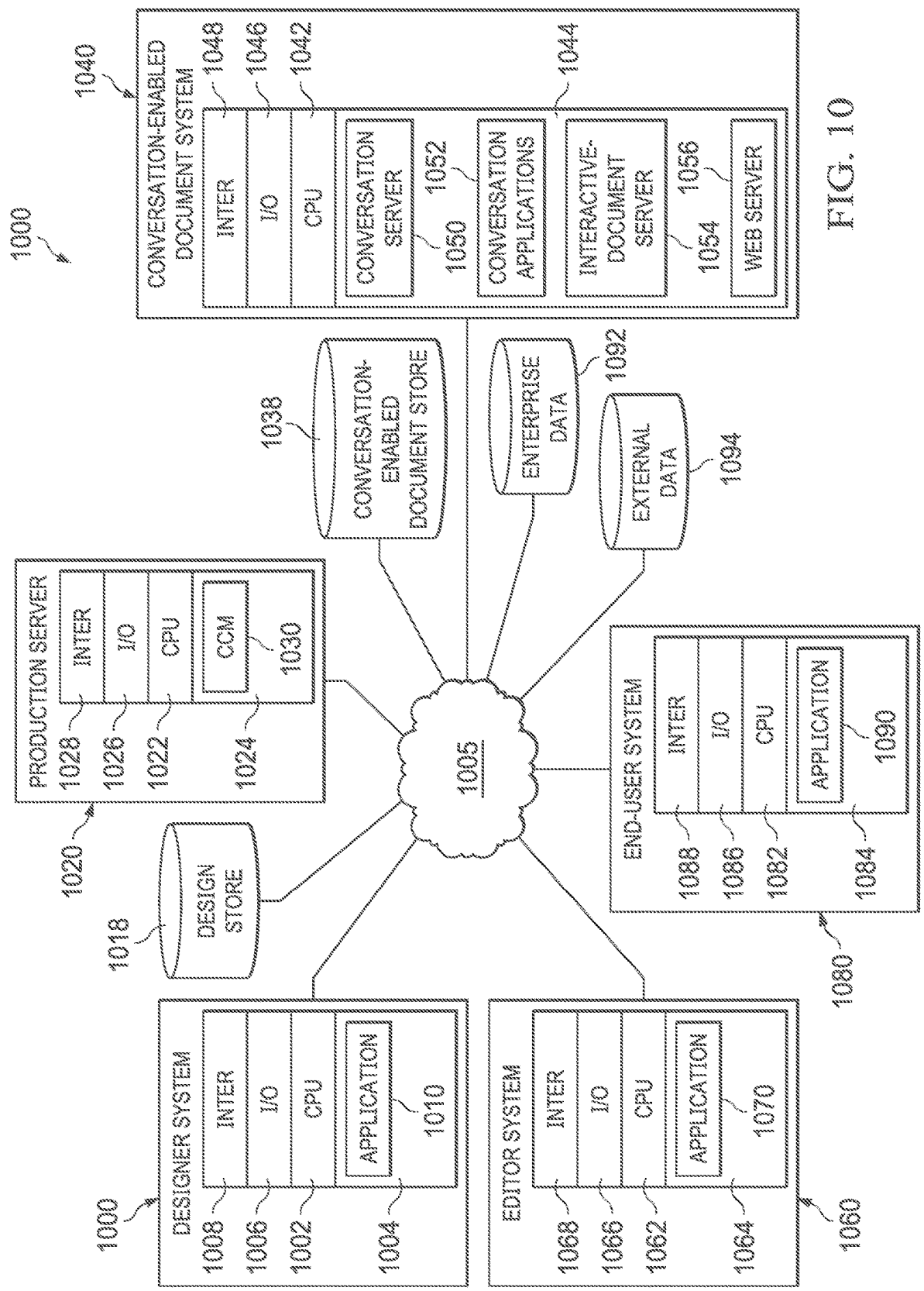
FIG. 10 is a diagrammatic representation of one embodiment of a distributed network computing environment.

Embodiments of the technology may be implemented on a computing system. Any combination of mobile desktop, server machine, embedded or other types of hardware may be used. FIG. 10 is a diagrammatic representation of one embodiment of a distributed network computing environment where embodiments disclosed herein can be implemented. The computing environment includes a designer computer system 1000, a production server computer system 1020, a conversation-enabled document computer system 1040, an editor computer system 1060 and an end-user computer system 1080 connected to a network 1005 (e.g., a local area network (LAN), a wide area network (WAN) such as the Internet, mobile network, or other type of network or combination thereof). Network 1005 can represent a combination of wired and wireless networks that a network computing environment may utilize for various types of network communications.

Designer computer system 1000 is one embodiment of a designer system 102, editor computer system 1060 is one embodiment of an editor system 118, 508 and end-user computer system 1080 is one embodiment of a user system 120, 506, or 706. Production server computer system 1020 is one embodiment of a production server 106. Conversation-enabled document computer system 1040 is one embodiment of a conversation-enabled interactive document system 110, 502 or a conversation-enabled document system 702.

Designer computer system 1000 includes, for example, a computer processor 1002 and associated memory 1004. Computer processor 1002 may be an integrated circuit for processing instructions, such as, but not limited to a CPU. For example, processor 1002 may comprise one or more cores or micro-cores of a processor. Memory 1004 may include volatile memory, non-volatile memory, semi-volatile memory or a combination thereof. Memory 1004, for example, may include RAM, ROM, flash memory, a hard disk drive, a solid-state drive, an optical storage medium (e.g., CD-ROM), or other computer readable memory or combination thereof. Memory 1004 may implement a storage hierarchy that includes cache memory, primary memory or secondary memory. In some embodiments, memory 1004 may include storage space on a data storage array. Designer computer system 1000 may also include input/output ("I/O") devices 1006, such as a keyboard, monitor, printer, electronic pointing device (e.g., mouse, trackball, stylus, etc.), or the like. Designer computer system 1000 may also include a communication interface 1008, such as a network interface card, to interface with network 1005.

Memory 1004 stores instructions executable by processor 1002. For example, memory 1004 may include a design application 1010 executable to allow a user to design a conversation-enabled application. Designs may be stored to a design data store 1018. Design data store 1018 may comprise a database, file system, other type of data store or combination thereof. According to one embodiment, design data store 1018 may be implemented by a DAM system, CMS, WCM system, or ECM system. Design data store 1018 is one embodiment of a design data store 104.

Production server computer system 1020 includes, for example, a computer processor 1022 and associated memory 1024. Computer processor 1022 may be an integrated circuit for processing instructions, such as, but not limited to a CPU. For example, processor 1022 may comprise one or more cores or micro-cores of a processor. Memory 1024 may include volatile memory, non-volatile memory, semi-volatile memory or a combination thereof. Memory 1024, for example, may include RAM, ROM, flash memory, a hard disk drive, a solid-state drive, an optical storage medium (e.g., CD-ROM), or other computer readable memory or combination thereof. Memory 1024 may implement a storage hierarchy that includes cache memory, primary memory or secondary memory. Production server computer system 1020 may also include I/O devices 1026, such as a keyboard, monitor, printer, electronic pointing device (e.g., mouse, trackball, stylus, etc.), or the like. Production server computer system 1020 may also include a communication interface 1028, such as a network interface card, to interface with network 1005.

Memory 1024 stores instructions executable by processor 1022. For example, memory 1024 may include a CCM software 1030 executable to process designs from design store 1018 to generate conversation-enabled documents and render the conversation-enabled documents to a number of outputs. According to one embodiment, CCM software 1030 is executable to provide a CCM engine (e.g., CCM engine 142) that can pull data from a variety of enterprise data sources 1092 and external data sources 1094.

According to one embodiment, CCM software 1030 is executable to render a conversation-enabled document to a conversation-enabled document store 1038, such as document store 108, 504, 704. Conversation-enabled document store 1038 may comprise a database, file system, other type of data store or combination thereof. According to one embodiment, conversation-enabled store 1038 may be implemented by a DAM system, CMS, WCM system, or ECM system.

Conversation-enabled document computer system 1040 includes, for example, a computer processor 1042 and associated memory 1044. Computer processor 1042 may be an integrated circuit for processing instructions, such as, but not limited to a CPU. For example, processor 1042 may comprise one or more cores or micro-cores of a processor. Memory 1044 may include volatile memory, non-volatile memory, semi-volatile memory or a combination thereof. Memory 1044, for example, may include RAM, ROM, flash memory, a hard disk drive, a solid-state drive, an optical storage medium (e.g., CD-ROM), or other computer readable memory or combination thereof. Memory 1044 may implement a storage hierarchy that includes cache memory, primary memory or secondary memory. Conversation-enabled document computer system 1040 may also include I/O devices 1046, such as a keyboard, monitor, printer, electronic pointing device (e.g., mouse, trackball, stylus, etc.), or the like. Conversation-enabled document computer system 1040 may also include a communication interface 1048, such as a network interface card, to interface with network 1005.

Memory 1044 stores instructions executable by processor 1042. For example, memory 1044 may include instructions to implement a conversation server 1050, such as conversation server 540, 740, executable to expose conversation-enabled documents on a conversation channel. Memory 1044 may also include instructions to implement one or more conversation platforms (e.g., chatbots, IVR systems or other conversation platforms). In some embodiments, memory 1044 further includes instructions to implement, various conversation applications 1052 (e.g., chatbots or other applications), an interactive document server 1054 or web server 1056.

Editor computer system 1060 includes, for example, a computer processor 1062 and associated memory 1064. Computer processor 1062 may be an integrated circuit for processing instructions, such as, but not limited to a CPU. For example, processor 1062 may comprise one or more cores or micro-cores of a processor. Memory 1064 may include volatile memory, non-volatile memory, semi-volatile memory or a combination thereof. Memory 1064, for example, may include RAM, ROM, flash memory, a hard disk drive, a solid-state drive, an optical storage medium (e.g., CD-ROM), or other computer readable memory or combination thereof. Memory 1064 may implement a storage hierarchy that includes cache memory, primary memory or secondary memory. In some embodiments, memory 1064 may include storage space on a data storage array. Editor computer system 1060 may also include I/O devices 1066, such as a keyboard, monitor, printer, electronic pointing device (e.g., mouse, trackball, stylus, etc.), or the like. Editor computer system 1060 may also include a communication interface 1068, such as a network interface card, to interface with network 1005.

Memory 1064 stores instructions executable by processor 1062. For example, memory 1064 may include an editing application 1070 executable to allow a user to edit an interactive document. In one embodiment, editing application 1070 is a web browser.

End-user computer system 1080 includes, for example, a computer processor 1082 and associated memory 1084. Computer processor 1082 may be an integrated circuit for processing instructions, such as, but not limited to a CPU. For example, processor 1082 may comprise one or more cores or micro-cores of a processor. Memory 1084 may include volatile memory, non-volatile memory, semi-volatile memory or a combination thereof. Memory 1084, for example, may include RAM, ROM, flash memory, a hard disk drive, a solid-state drive, an optical storage medium (e.g., CD-ROM), or other computer readable memory or combination thereof. Memory 1084 may implement a storage hierarchy that includes cache memory, primary memory or secondary memory. In some embodiments, memory 1084 may include storage space on a data storage array. End-user computer system 1080 may also include I/O devices 1086, such as a keyboard, monitor, printer, electronic pointing device (e.g., mouse, trackball, stylus, etc.), or the like. End-user computer system 1080 may also include a communication interface 1088, such as a network interface card, to interface with network 1005.

Memory 1084 stores instructions executable by processor 1082. For example, memory 1084 may include an application 1090 executable to allow a user to participate in a conversation. According to one embodiment, application 1090 is a web browser.

Those skilled in the relevant art will appreciate that the invention can be implemented or practiced with other computer system configurations including, without limitation, multi-processor systems, network devices, mini-computers, mainframe computers, data processors, and the like. The invention can be embodied in a general-purpose computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet.

In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

What is claimed is:

1. A non-transitory, computer-readable medium embodying thereon computer-executable instructions for:
receiving, based on user interaction with an interactive document design interface, a document design comprising:
a page template specifying content of a communication page for a communication channel, the page template specifying a first variable to be populated and a second variable to be populated; and a conversation template embodied as a conversation object that references a plurality of node objects, the conversation template defining a state machine for an automated conversation on a conversation channel, the conversation template referencing a plurality of node templates that represent steps in the automated conversation, wherein the plurality of node templates comprises a first node template that comprises:
   a prompt to present to a conversation participant for a corresponding step of the automated conversation; and
   a participant response definition, the participant response definition specifying the first variable as a variable to which a participant response is to be written;
generating a conversation-enabled document from the document design, wherein the conversation-enabled document is renderable on multiple communication channels including the conversation channel and at least one other type of communication channel, wherein the conversation-enabled document comprises a document container, the document container comprising:
   a conversation component for controlling a conversation interface into the conversation-enabled document, the conversation component comprising data specifying:
   conversation steps;
   routing between the conversation steps; and
   the first variable as the variable to which the participant response is to be written;
   document data comprising data values for populating the second variable for a plurality of potential conversation participants; and
   the page template.

2. The non-transitory, computer-readable medium of claim 1, wherein the page template comprises a definition of content and layout of a page of an end-user communication, wherein the end-user communication is an email, a Short Message Service (SMS) communication, a printed communication, a file, or a web page.

3. The non-transitory, computer-readable medium of claim 1, wherein the document container comprises an extensible Markup Language (XML) representation of the conversation template, and wherein the XML representation of the conversation template specifies the conversation steps, the routing between the conversation steps and the first variable as the variable to which the participant response is to be written.

4. The non-transitory, computer-readable medium of claim 1, wherein the computer-executable instructions are further for:
creating the plurality of node templates based on user interaction with the interactive document design interface; and
adding the node template to the conversation template.

5. The non-transitory, computer-readable medium of claim 1, wherein the computer-executable instructions are further for:
receiving, based on user interaction with the interactive document design interface, the prompt for the corresponding step; and
adding the prompt to the first node template.

6. The non-transitory, computer-readable medium of claim 5, wherein the prompt specifies a third variable and comprises logic for selecting a prompt option based on a value of the third variable.

7. The non-transitory, computer-readable medium of claim 1, wherein the first node template comprises validation rules for validating conversation participant response data.

8. The non-transitory, computer-readable medium of claim 6, wherein the participant response definition specifies the variable to which the participant response is to be written and a data type expected to be received for the variable to which the participant response is to be written.

9. A computer-implemented method comprising:
receiving, based on user interaction with an interactive document design interface, a document design comprising:
   a page template specifying content of a communication page for a communication channel, the page template specifying a first variable to be populated and a second variable to be populated; and
   a conversation template embodied as a conversation object that references a plurality of node objects, the conversation template defining a state machine for an automated conversation on a conversation channel, the conversation template referencing a plurality of node templates that represent steps in the automated conversation, wherein the plurality of node templates comprises a first node template that comprises:
      a prompt to present to a conversation participant for a corresponding step of the automated conversation; and
      a participant response definition, the participant response definition specifying the first variable as a variable to which a participant response is to be written;
generating a conversation-enabled document from the document design, wherein the conversation-enabled document is renderable to multiple communication channels including the conversation channel and at least one other type of communication channel, wherein the conversation-enabled document comprises a document container, the document container comprising:
   a conversation component for controlling a conversation interface into the conversation-enabled document, the conversation component comprising data specifying:
   conversation steps;
   routing between the conversation steps; and
   the first variable as the variable to which the participant response is to be written;
   document data comprising data values for populating the second variable for a plurality of potential conversation participants; and
   the page template.

10. The computer-implemented method of claim 9, wherein the page template comprises a definition of content and layout of a page of an end-user communication, wherein the end-user communication is an email, a Short Message Service (SMS) communication, a printed communication, a file, or a web page.

11. The computer-implemented method of claim 9, wherein the document container comprises an extensible Markup Language (XML) representation of the conversation template, and wherein the XML representation of the conversation template specifies the conversation steps, the routing between the conversation steps and the first variable as the variable to which the participant response is to be written.

12. The computer-implemented method of claim 9, further comprising:
creating the plurality of node templates based on user interaction with the interactive document design interface; and
adding the plurality of node templates to the conversation template.

13. The computer-implemented method of claim 12, further comprising:
receiving, based on user interaction with the interactive document design interface, the prompt for the corresponding step; and
adding the prompt to the first node template.

14. The computer-implemented method of claim 13, wherein the prompt specifies a third variable and comprises logic for selecting a prompt option based on a value of the third variable.

15. The computer-implemented method of claim 12, wherein the first node template comprises validation rules for validating conversation participant response data.

16. The computer-implemented method of claim 15, wherein the participant response definition specifies the variable to which the participant response is to be written and a data type expected to be received for the variable to which the participant response is to be written.

17. A customer communication management (CCM) system comprising:
a designer computer system comprising a processor and a document design application for designing multichannel documents, wherein the document design application is executable to:
receive, based on user interaction with an interactive document design interface, a document design comprising:
a page template specifying content of a communication page for a communication channel, the page template specifying a first variable to be populated and a second variable to be populated; and
a conversation template embodied as a conversation object that references a plurality of node objects, the conversation template defining a state machine for an automated conversation on a conversation channel, the conversation template referencing a plurality of node templates that represent steps in the automated conversation, wherein the plurality of node templates comprises a first node template that comprises:
a prompt to present to a conversation participant for a corresponding step of the automated conversation; and
a participant response definition, the participant response definition specifying the first variable as a variable to which a participant response is to be written;
a production server comprising a CCM engine executable to:
receive the document design;
generate a multichannel, conversation-enabled document, wherein the multichannel, conversation-enabled document comprises a document container, the document container comprising:
a conversation component for controlling a conversation interface into the multichannel, conversation enabled document, the conversation component comprising data specifying:
conversation steps;
routing between the conversation steps; and
the first variable as the variable to which the participant response is to be written;
document data comprising data values for populating the second variable for a plurality of potential conversation participants; and
the page template.

18. The CCM system of claim 17, wherein the page template comprises a definition of content and layout of a page of an end-user communication, wherein the end-user communication is an email, a Short Message Service (SMS) communication, a printed communication, a file, or a web page.

19. The CCM system of claim 17, wherein the document container comprises an extensible Markup Language (XML) representation of the conversation template, and wherein the XML representation of the conversation template specifies the conversation steps, the routing between the conversation steps and the first variable as the variable to which the participant response is to be written.

20. The CCM system of claim 17, wherein in the document design application is further executable to:
create the plurality of node templates based on user interaction with the interactive document design interface; and
add the node template to the conversation template.

21. The CCM system of claim 20, wherein in the document design application is further executable to:
receive, based on user interaction with the interactive document design interface, the prompt for the corresponding step; and
add the prompt to the first node template, wherein the prompt specifies a third variable and comprises logic for selecting a prompt option based on a value of the third variable.

22. The CCM system of claim 20, wherein the participant response definition specifies the variable to which the participant response is to be written and a data type expected to be received for the variable to which the participant response is to be written.

* * * * *